United States Patent
Jones et al.

(10) Patent No.: US 6,923,900 B2
(45) Date of Patent: Aug. 2, 2005

(54) ALLOY PIPES AND METHODS OF MAKING SAME

(75) Inventors: John Jones, Bishop Auckland (GB); Michael J. Yardley, Seaton (GB); Terry K Barker, Richmond (GB)

(73) Assignee: Doncasters PLC, Derbyshire (GB)

( * ) Notice: Subject to any disclaimer, the term of this patent is extended or adjusted under 35 U.S.C. 154(b) by 501 days.

(21) Appl. No.: 09/874,168

(22) Filed: Jun. 4, 2001

(65) Prior Publication Data

US 2001/0054449 A1 Dec. 27, 2001

Related U.S. Application Data

(62) Division of application No. 09/375,586, filed on Aug. 17, 1999, now Pat. No. 6,250,340.

(30) Foreign Application Priority Data

Aug. 20, 1998 (GB) ............................................. 9818158

(51) Int. Cl.$^7$ ................................. C25F 3/02; C25F 7/00
(52) U.S. Cl. ........................ 205/654; 205/674; 205/685; 205/686; 204/224 M; 204/225
(58) Field of Search ................................. 205/654, 674, 205/685, 686; 204/224 M, 225

(56) References Cited

U.S. PATENT DOCUMENTS

| | | | | |
|---|---|---|---|---|
| 3,533,926 A | * | 10/1970 | Zubak et al. ................ | 205/654 |
| 3,769,194 A | | 10/1973 | Haggerty ..................... | 204/224 |

(Continued)

FOREIGN PATENT DOCUMENTS

| | | | | |
|---|---|---|---|---|
| EP | 0 607 894 A1 | 7/1994 | ............ | B23H/9/16 |
| EP | 0 812 926 A1 | 12/1997 | ............ | C22C/38/08 |
| EP | 0 889 146 A1 | 1/1999 | ............ | C23C/10/42 |
| FR | 2 687 946 A1 | 9/1993 | ............ | B32H/9/00 |
| GB | 954348 | 4/1964 | | |
| GB | 969796 | 9/1964 | | |
| GB | 1 170 644 | 11/1969 | | |
| GB | 1 281 117 | 7/1972 | ............ | B23P/1/12 |
| GB | 2 064 400 A | 6/1981 | ............ | B23P/1/02 |
| GB | 2 086 291 A | 5/1982 | ............ | B23P/1/14 |
| GB | 2 100 284 A | 12/1982 | ............ | C22C/38/48 |
| GB | 2 174 945 A | 11/1986 | ............ | B23H/3/00 |
| SU | 1 357 161 A1 | 12/1987 | ............ | B23H/3/04 |
| SU | 1 516 263 A1 | 10/1989 | ............ | B23H/3/04 |
| SU | 1696197 A1 | 7/1991 | ............ | B23H/9/04 |
| SU | 1790638 A3 | 1/1993 | ............ | C25D/19/00 |
| WO | WO 98/56872 | 12/1998 | ............ | C10G/9/20 |

OTHER PUBLICATIONS

"Faraday's Law in the Factory" by John A. Cox, Anocut Engineering Company, Chicago, IL.

(Continued)

Primary Examiner—Donald R Valentine
(74) Attorney, Agent, or Firm—Fish & Richardson P.C.

(57) ABSTRACT

A profiled tube (50b) comprising a high carbon content alloy (greater than 0.3%), superalloy or other high creep strength material, has a fluted bore with internal fins (52b) and intervening valleys or troughs (56b). Such a tube is made by centrifugal casting and subsequent electrochemical machining by drawing of an electrode (104) along the tube while at the same time passing electrolyte along the tube and around the electrode and also applying an electrical current between the tube and electrode, so that material of the tube passes into solution in the electrolyte.

The electrode (104) has the same profile as the end-profile required in the tube (80) but has an inclined working face (124). An electrode rod (92) drives the electrode from one end mounting means (82) to another (84), each of which support the tube (80) and supply/exhaust electrolytic solution. The electrolyte is preferably sodium nitrate, although an acid based system is feasible.

49 Claims, 20 Drawing Sheets

U.S. PATENT DOCUMENTS

| | | | |
|---|---|---|---|
| 3,954,421 A | | 5/1976 | Heuschkel .................... 29/183 |
| 4,026,779 A | | 5/1977 | Shaw ..................... 204/128.65 |
| 4,444,589 A | | 4/1984 | Sugitani et al. ................ 75/128 |
| 4,690,737 A | * | 9/1987 | Vishnitsky .................. 205/654 |
| 4,826,582 A | * | 5/1989 | Lavalerie et al. ....... 204/272 X |
| 4,827,074 A | | 5/1989 | Suwa et al. .................. 585/648 |
| 5,004,529 A | | 4/1991 | Vishnitsky .................. 204/212 |
| 5,409,675 A | | 4/1995 | Narayanan .................. 422/197 |

OTHER PUBLICATIONS

"The ECM Process", Anocut Engineering Company, Chicago, IL.

"Electrochemical Machining: a space–age way to refine forged, extruded and cast shapes", Anocut Engineering Company, Chicago, IL, Feb.–Mar. 1969.

WPI Abstract Accession No. 85–252041 and JP600165343 (Kubota) Aug. 2, 1984 see abstract.

WPI Abstract Accession No: 82–82187E and JP570134536 (Mitsubishi) Feb. 16, 1981 see abstract.

WPI Abstract Accession No. 77–53033Y and JP520070924 (Kubota) Jun. 13, 1977 see abstract.

* cited by examiner

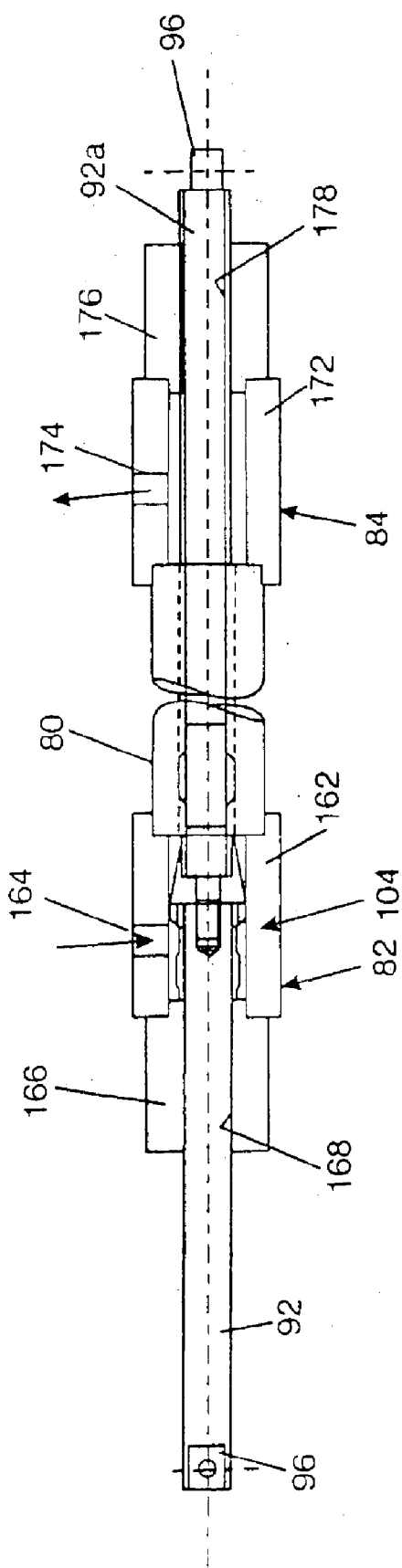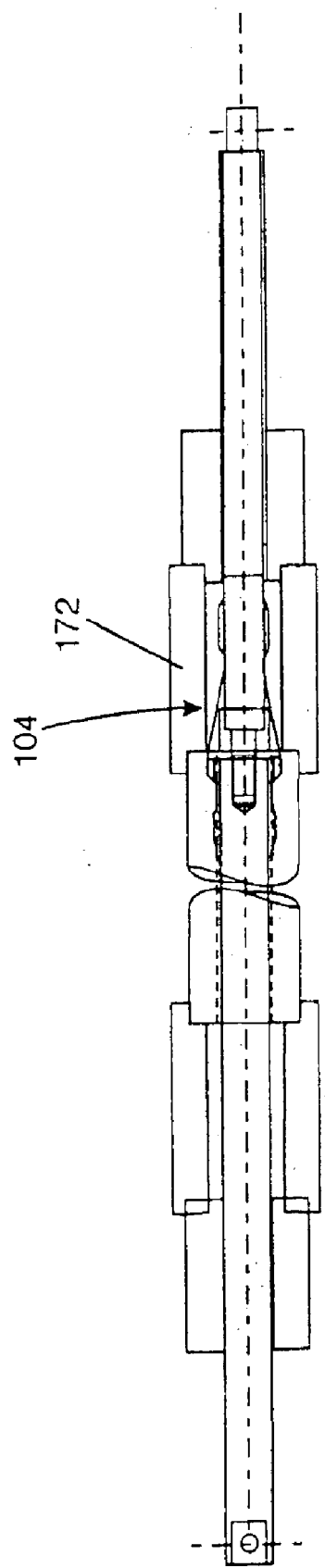

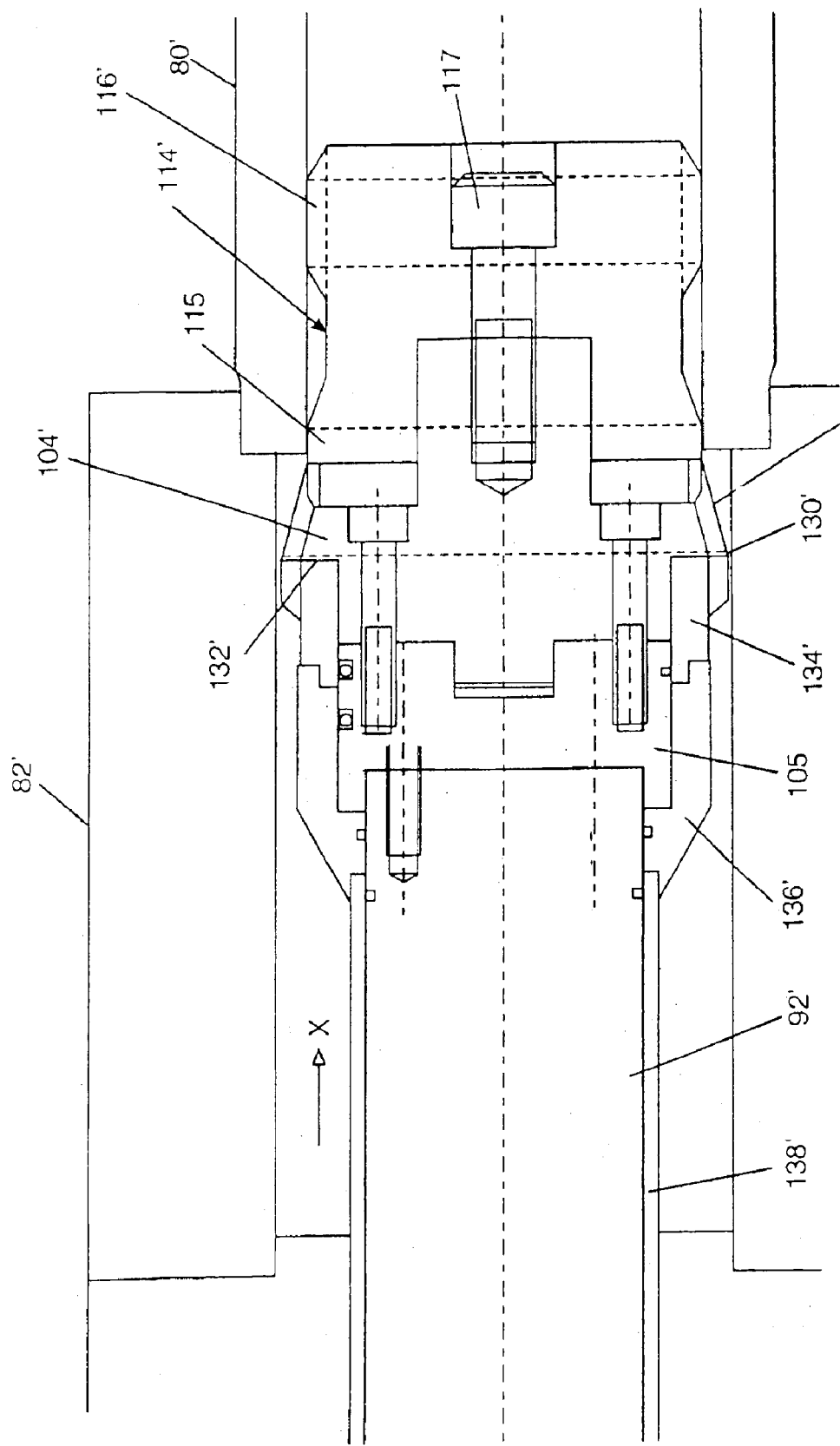

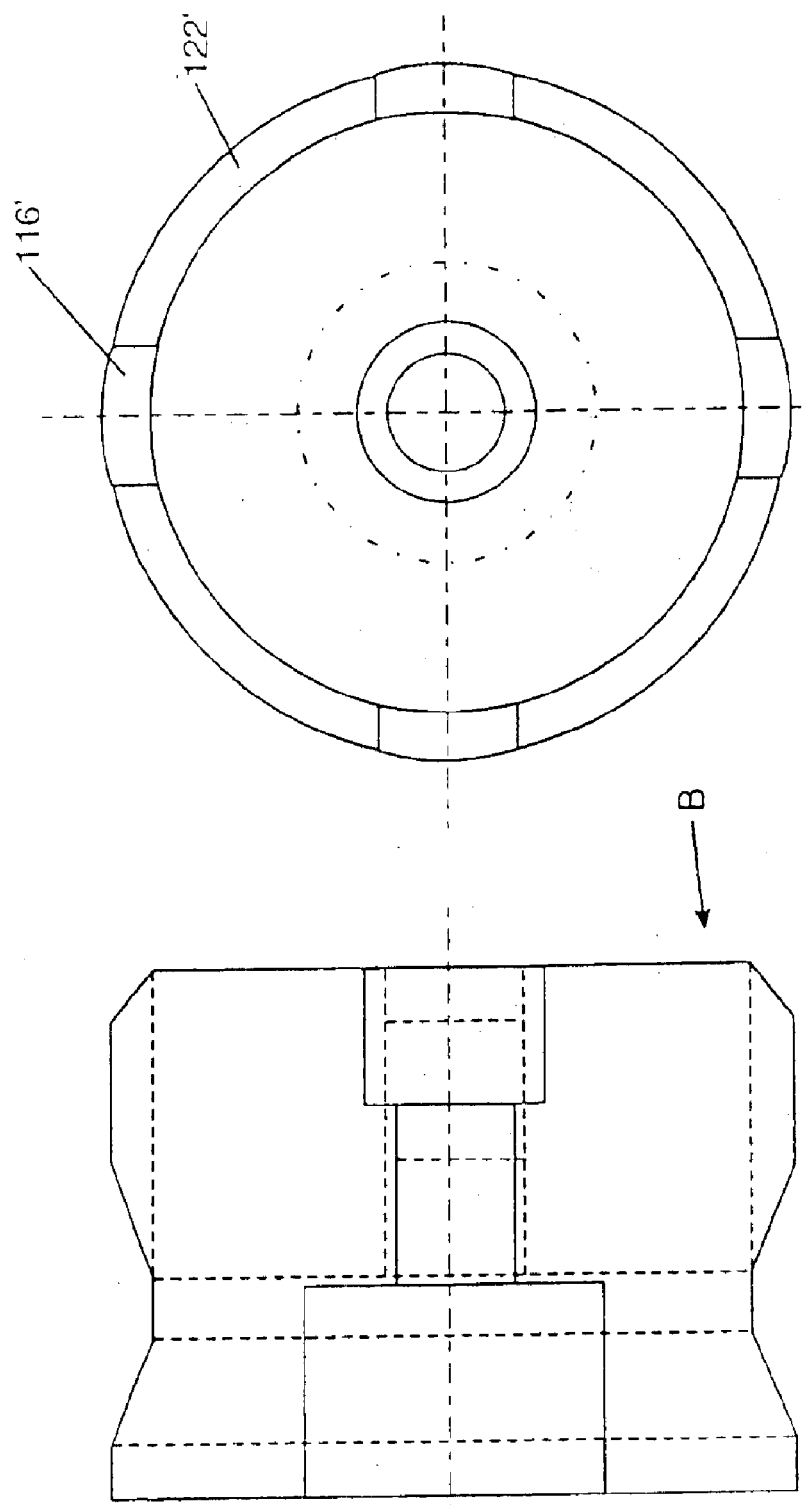

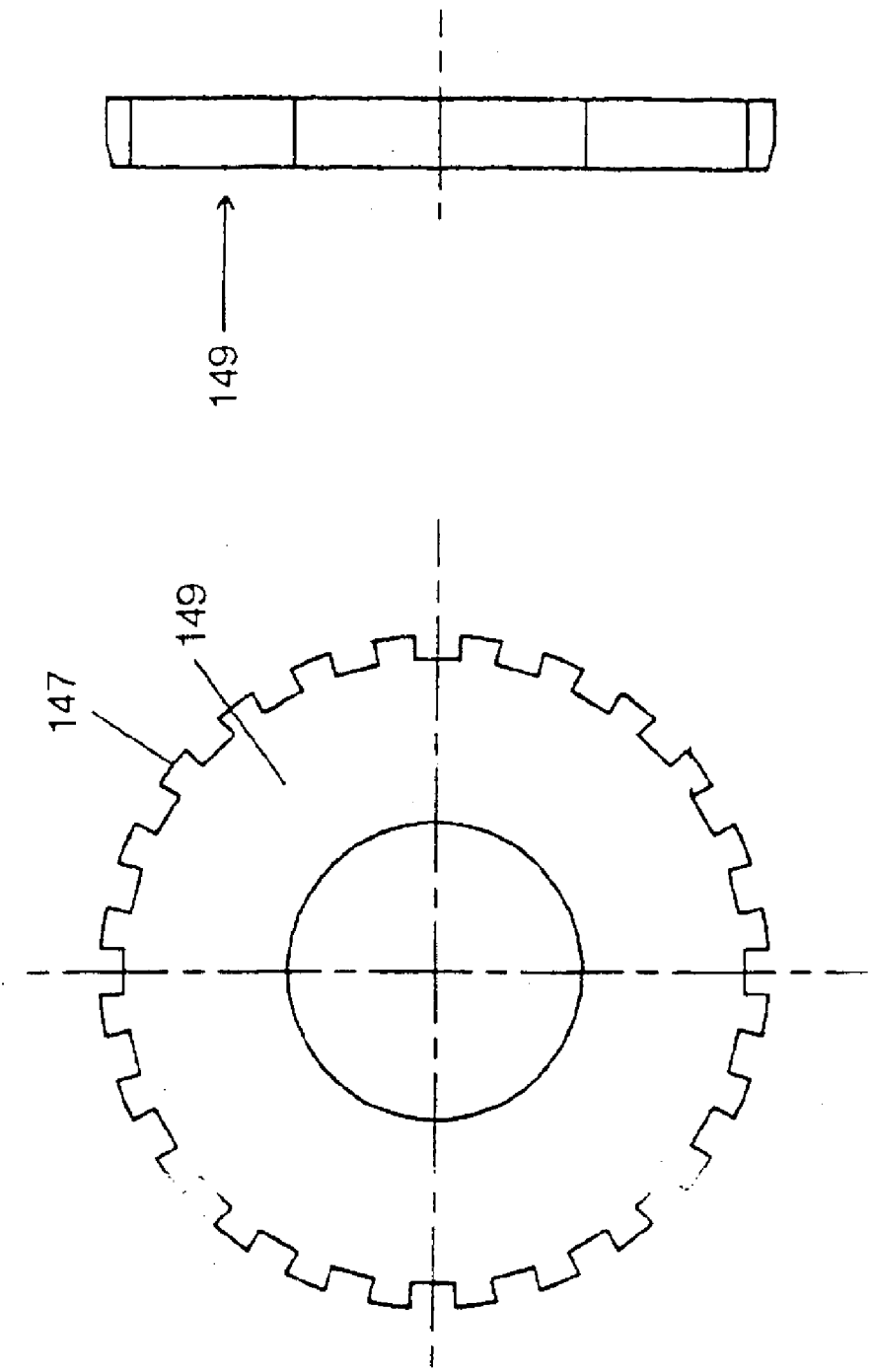

ALLOY PIPES AND METHODS OF MAKING SAME

This application is a division of U.S. Ser. No. 09/375,586 filed Aug. 17, 1999, now U.S. Pat. No. 6,250,340.

This invention relates to alloy pipes or tubes and to methods of manufacturing such tubes. In particular, the invention is concerned with tubes destined for the chemical processing industry and especially for petrochemical processing.

The world relies upon petrochemical plant to supply essential materials such as plastics, fertilisers and other chemical products that are part of modern life. The demand for increased output and efficiency, with reduced costs and pollution, means that plant design and operation requires constant attention and improvement.

Central or key areas of a plant, which can benefit from such improvements, are the main fired furnaces, for example. "Steam Cracker" furnaces, which utilise the pyrolysis cracking process to produce ethylene, and primary "Steam Reformer" furnaces, which produce hydrogen, possibly for subsequent conversion to ammonia, methanol etc.

These processes consume large amounts of energy (fuel and heat) and also expose the furnace materials, particularly the process tubes, to some of the most damaging environments in industry. Therefore, selection of the most advanced alloys is highly desirable in order to achieve the required improvements in service life, efficiency and performance.

Pyrolysis and reforming furnace technology is dependent upon one common element, the efficiency of the furnace tubes. Fired heaters must operate continuously at extremely high temperatures, for substantial periods of time. Typically a cracking furnace will operate in the range of 1050–1120° C., with an expected life of, for example, five to seven years. A steam reforming furnace, with an expected life of say 12 years, may typically operate with tube temperatures in the range 900–1000° C. By selecting the best alloy for the furnace tubes, several efficiency gains may be achieved with one decision.

The range of high temperature alloys required for fired heaters used within the petrochemical industry can sometimes cause confusion since the majority are not included in international specifications such as "ASTM" and "ASME". In addition, these alloys are frequently known by their proprietary name. In reality there are a small family of alloys currently suitable for selection for fired heater tubes. Within this family, the major properties are influenced by the amount of important alloying elements present, and these can be summarized as follows:

NICKEL: Gives a stable austenitic structure, which contributes to both hot strength and good ductility. Nickel is also the principal element which reduces carburisation of the alloy and corrosion rates at high temperature.

CHROMIUM: Provides resistance to high temperature carburisation by the formation of an adherent tube surface film rich in chromium oxide. Chromium also contributes to high temperature strength through the formation of carbides.

CARBON: Is an austenitic stabiliser and by far the most important element for controlling hot strength and creep resistance. Carbon forms both primary interdendritic carbides, and, during service, precipitates the essential secondary carbides in the matrix, which reduce creep damage.

NIOBIUM: Improves the stability of the carbides improving creep strength and also improving weldability.

SILICON: Like chromium, silicon contributes to the formation of oxide films, which increase carburisation resistance.

There is a range of alloys available having various quantities of the above ingredients and, as a result, having varying qualities. However, typically, such alloys comprise the following constituents in the proportion indicated, the balance comprising iron:

| Element | % by weight |
| --- | --- |
| Carbon | 0.1–0.5 |
| Chromium | 20–35 |
| Nickel | 20–45 |
| Niobium | 0–2 |
| Silicon | 0–2 |
| Tungsten | 0–5 |
| additions | 0–1 |

The present invention is primarily concerned with such alloys which are hereby defined as "creep resistant alloys" in view of their resistance to creep. However, there are other materials such as cast superalloys, nickel based intermetallics and possibly even iron aluminides which may be suitable materials and hence are to be considered within the scope of the term "creep resistant alloys".

An alternative definition of a "creep resistant alloy", also within the ambit of the present invention, is to refer to its 100,000 hour mean stress rupture value, which is a value of most use to a furnace designer when selecting alloys and the dimensions to be employed. Thus in another aspect the invention is concerned with alloys which have a value of more than 6 MPa at 1000° C. in this test, and preferably greater than 10 MPa.

Since the excellent high temperature properties, high carbon content and cast grain size of carbon steel based creep resistant alloys reduce the plasticity and malleability of these alloys, such creep resistant alloys cannot be readily forged, and casting is essentially the only manufacturing method which can be used to produce the required tubes and fittings. The same is true of other creep resistant alloys. Consequently it is only with cast creep resistant alloys that the present invention is concerned.

The two major furnace types (steam cracking—ethylene, and steam reforming—hydrogren) each present different problems and each can be considered separately in order to show how optimum alloy selection can provide significant benefits to operators and designers.

1. Steam Cracker Furnaces

Pyrolysis furnaces basically consist of an insulated box containing tubular coils that enter and exit through the furnace wall, providing a flowpath through the furnace. Since the required pyrolysis reactions (conversion of steam and hydrocarbons into ethylene) are endothermic, burners located on the side and/or bottom of the furnace heat the outside surface of the coils. Whilst a few furnaces use horizontal coils, the great majority use coils mounted vertically.

Feedstock (such as naphtha, liquid propane gas or ethane) is mixed with steam and passed into the furnace under pressure (around 2–5 Kg/cm$^2$). Generally an upper, convection section pre-heats the incoming feedstock by convection of heat from the burners in a lower radiant zone. Once through the convection section the feedstock enters a pyrolysis or radiant section. This main section consists of tubes which are typically 12–14 meters long and diameters ranging from 50–100 mm. In the majority of designs these tubes are arranged vertically. They are heated by the furnace burners to 950–1150° C., transferring sufficient heat through the tubes to the feedstock to break it down into ethylene.

During operation, a coke layer will build up inside the hotter sections of the coils, and this coke must be removed by burning the coke away with de-coke operations performed at required intervals. The coil alloy itself will become carburised when in contact with the deposited coke and with the feedstock during high temperature operations, and this process will become more severe with time, dramatically affecting alloy properties. The production of ethylene is therefore one of the most aggressive environments to which alloys can be exposed.

Optimum performance is required in various areas to resist several possible damage mechanisms, which include carburisation, thermal cycling, creep damage and coke build-up. Carburisation will reduce alloy properties such as ductility, creep strength, and weldability. Resistance to carburisation can be improved by generating a protective coating on the internal surface of the coils, and using tubes with a higher alloy content. Silicon and chromium contribute to developing a protective oxide film, although this may be damaged during de-coke operations or thermal cycles and should be restored where possible. Increasing the nickel content is an effective method of inhibiting carbon absorption.

2. Steam Reformer (Catalyst) Furnaces

For the reformer furnace designer or operator the problems are slightly different, but similar efficiency benefits are possible through optimum alloy selection. As with pyrolysis furnaces, several different designs of furnace exist, but the demands on the reformer tube alloy are the same. Primary steam reforming furnaces are used to convert a feedstock of hydrocarbons and steam into hydrogen rich gases in order to produce hydrogen itself, or for use in manufacturing products such as ammonia and methanol. The reformer tubes are filled with catalyst and the feedstock is passed through the tubes under high pressures ranging generally between 28–43 $Kg/cm^2$. The tubes are heated by burners within the furnace to temperatures between 875–1000° C. On exit from the tubes, the reaction gas is discharged into a manifold and transferred to a secondary reforming unit.

Because of the temperatures and pressures involved in the process the primary damage mechanism to reformer tubes is creep, and thus choosing the strongest alloy for the tubes can provide several design and operational benefits. Corrosion is not usually a significant problem.

Thus tubes constructed from creep resistant alloys are valuable in extending tube life and increasing furnace efficiency.

However, as mentioned above, the only practical way of manufacturing such tubes for both Steam Cracker furnaces and Steam Reformer furnaces is by centrifugal casting in which molten alloy is poured into the end of a tubular mould rotating at such high speed that the molten alloy forms a layer of liquid alloy on the inside of the mould.

Once the alloy has solidified, rotation of the mould is stopped and the so-formed tube can be pushed out. The tube is bored out along its length to provide the required internal diameter. Any impurities will always be lighter than the alloy and therefore will "float" on the inside of the tube and are thus removed by the boring step. In any event, the inside profile of the finished tube is circular.

However, in the 1980's new designs of steam cracker furnaces were developed for ethylene production, and which improved yields significantly. These designs rely upon the hydrocarbon feedstock gases travelling more quickly through the heating coils. In order to ensure adequate heating of the gases, improved heat transfer is required and this has been addressed by using small bore, thin walled tubes, as well as tubes internally profiled with fins or flutes. Rifling of fluted tubes has also been proposed in order to improve gas flow.

Hitherto, such fluting or finning can only be formed economically by employing malleable materials capable of being wrought and/or extruded with the appropriate profile. However, cast creep resistant alloys cannot be extruded, at least not without destroying much of the properties which make their use attractive. On the other hand, malleable materials do not have the requisite creep strength to survive long in the environment of cracking furnaces and accordingly it has long been recognised that improvement of their properties is required.

It has been suggested to deposit a weld line in spiral form along a cast tube of creep resistant alloy but this has only a marginal improvement.

It is therefore an object of the present invention to address these problems and provide a novel tube which has both the requisite creep strength and heat transfer capabilities required, and to provide a method of making same.

In accordance with a first aspect of the present invention there is provided a centrifugally cast tube comprising creep resistant alloy (as hereinbefore defined) and having an internal profile which is non-circular, such that, in cross-section, the length of the internal profile is at least 10% longer than the circumference of the smallest circle which encompasses the entire profile.

Typically, but not necessarily, said profile is symmetrical. Preferably said profile is essentially sinusoidal. Preferably the ratio of pitch to amplitude of said sinusoidal profile, the pitch comprising the circumference of said smallest circle divided by the number of peaks of the profile, is between 2 and 4, preferably about 3.

Typically, but not necessarily, said tube has a macro-structure comprising radially directed columnar grains in an outer layer and equiaxed grains in an inner layer. Said smallest circle may lie in said inner layer.

In any event, it is a feature of at least one aspect of the present invention that pipes and tubes according to the invention have an as cast micro- and macro-structure, unless modified, subsequently or as an intermediate step, by heat treatment, for example. Heat treatment modifies one aspect of the microstructure, namely grain constituents, but leaves physical shape substantially unaffected. Moreover, in some cases, (and this is feasible even with creep resistant alloys); pipes may need to be hot bent over a large radius and this also will affect the macrostructure of the alloy.

The invention also provides a pyrolysis or reformer furnace comprising tubes as defined above.

In accordance with a second aspect of the present invention there is provided a method of forming an end-profile in the bore of a creep resistant alloy (as hereinbefore defined) tube, the method comprising the steps of:

drawing an electrode having an external profile corresponding with the desired end-profile of the tube from a first end of the tube to its second end;

applying a potential difference across a space between a target area of the tube and the electrode so that electric current flows between the tube and electrode;

passing electrolyte along the tube to enable said current flow and so that metal leaves the surface of the target area of the tube and enters solution in the electrolyte; and maintaining the rate of draw of the electrode along the tube so that said space between remains substantially constant.

Preferably said current is at a density between 20 and 80 amps $cm^{-2}$ across the target area, and preferably between 30 and 70 amps cm$^{-2}$, more preferably, about 50 amps cm$^{-2}$. Said rate of draw may be between 2 and 20 mm per minute, preferably between 5 and 7 mm per minute.

Preferably, material is removed from all surfaces of the start-profile of the tube. The tube therefore has a start-profile, preferably circular having a maximum diameter less than the diameter of a largest circle capable of fitting in said end-profile.

Preferably, electrolyte flows from said first end to said second end of the tube at a rate sufficient to maintain fresh electrolyte in the region of the machining and to clear way the metal coming into solution. The precise volume flow depends on a number of factors, including the total current load and the area of the target.

Preferably, said space is between 0.2 and 0.7 mm, preferably about 0.5 mm.

Preferably, said electrode is inclined with respect to the direction of draw so that the target area is increased.

In accordance with a third aspect of the present invention there is provided electrochemical machining apparatus to machine a profile on the inside of a tube having a start-profile, said apparatus comprising:

starting and ending mounting means to mount a tube to be machined, each adopted to seal against one end of the tube and supply one end of the tube with electrolyte, the other end exhausting electrolyte;

an electrode having a profile corresponding with said end-profile and mounted on the end of an insulated conductor rod extending sealingly through an aperture in one of said mounting means;

power connection means to connect an electrical voltage between the tube and electrode;

draw means operatively connected to said other end of said rod to drive said electrode into the bore of the tube to machine an end-profile in said tube when current is passed between a target area of the tube and the electrode and metal leaves the tube to enter solution in the electrolyte;

said rod being long enough that said electrode can be within the confines of either mounting means without said draw means contacting the other of said mounting means.

Preferably, the end-profile is non-circular such that, in cross-section, the length of said end-profile is at least 10% longer than the circumference of the smallest circle which encompasses the entire end-profile.

Preferably, said electrode has a front end and rear end in the direction of draw, said rear end having a final section of constant cross-section, preferably less than 2 mm in length.

Preferably, said electrode tapers from said rear end to said front end, the cross section of said front end having an overall diameter not more than a minimum diameter of the start-profile of said tube.

Preferably, said end-profile is essentially sinusoidal having peaks and troughs. In this event said electrode at its front end may have sections which are insulated so as not to remove material of the tube bore from the peaks of said end-profile. On the other hand, towards its rear end it may have no insulated sections, so that material is removed around the complete circumference of the tube bore.

Preferably, said electrode comprises a front guide and a rear guide, the front guide having a cross-section corresponding with the start-profile of the tube and the rear guide having a profile corresponding with the end-profile of the tube, means being provided to permit passage of electrolyte.

Preferably, said passage means comprises said rear guide being circular and being a close sliding fit on the peaks of said end-profile, so that electrolyte flows in the troughs of the end-profile.

Preferably, said passage means comprises said front guide having slots in its surface.

Preferably, said rod extends through said starting mounting means. Additionally, however, an insulated rod extension may also pass sealingly through an aperture in said ending mounting means, said rod extension also being connected to said power connection means and to the electrode enabling more electrical power to be supplied to the electrode.

In yet another aspect, the present invention also provides a method of forming a pyrolysis or reformer furnace tube comprising:

providing a molten creep resistant alloy (as hereinbefore defined);

casting the alloy in a rotating tubular mould to form a tubular blank having a central longitudinal bore;

preferably mechanically boring out the blank to a circular bore of predetermined radius; and electrochemically machining a profile inside said bore by drawing a shaped electrode along the tube while at the same time passing electrolyte along the tube and passing current between the tube and electrode.

The invention is further described hereinafter, by way of example, with reference to the accompanying drawings, in which:

FIG. 1 is a perspective view of a tube arrangement in a pyrolysis cracking furnace;

FIGS. 2a to d are a section, the internal surface profile, the etched micro-structure in the wall, and the etched micro-structure of a longitudinal section along the bore, of a wrought finned tube according to the prior art;

FIGS. 3a to d are corresponding sections of a tube in accordance with the present invention;

FIGS. 7a and 7b show the apparatus of FIG. 6 with the electrode at a starting mounting means, and an ending mounting means respectively;

FIG. 11 is a side section through an electrode of a second embodiment of apparatus in accordance with the present invention;

FIGS. 13a and 13b are a side section and end view in the direction of arrow B in FIG. 13a, respectively, of a front guide for use with the electrode of FIG. 12;

FIGS. 14a and 14b are an end view and side section through a mask for use with the electrode of FIG. 12;

Figure 1:
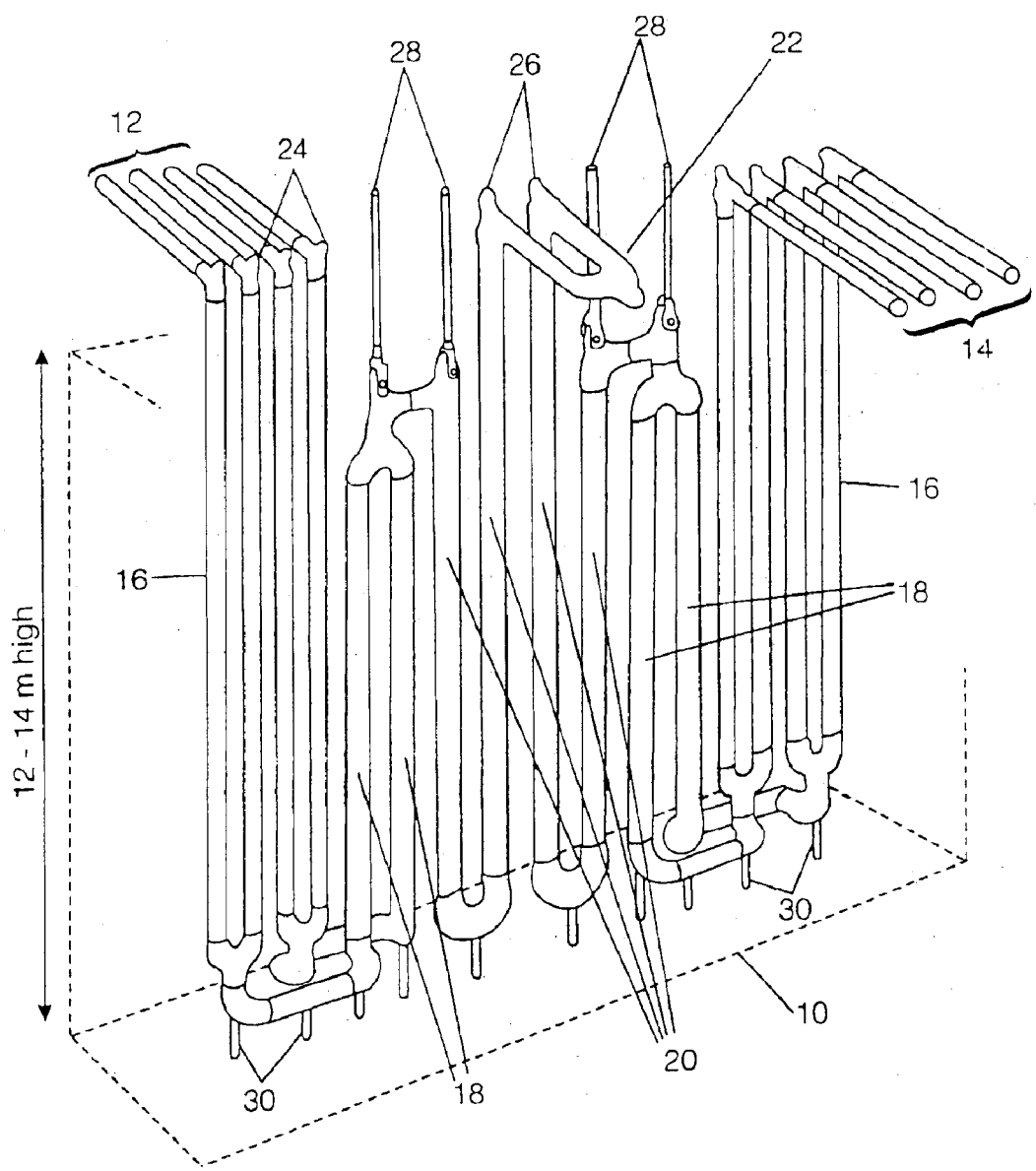
Figure 3A:
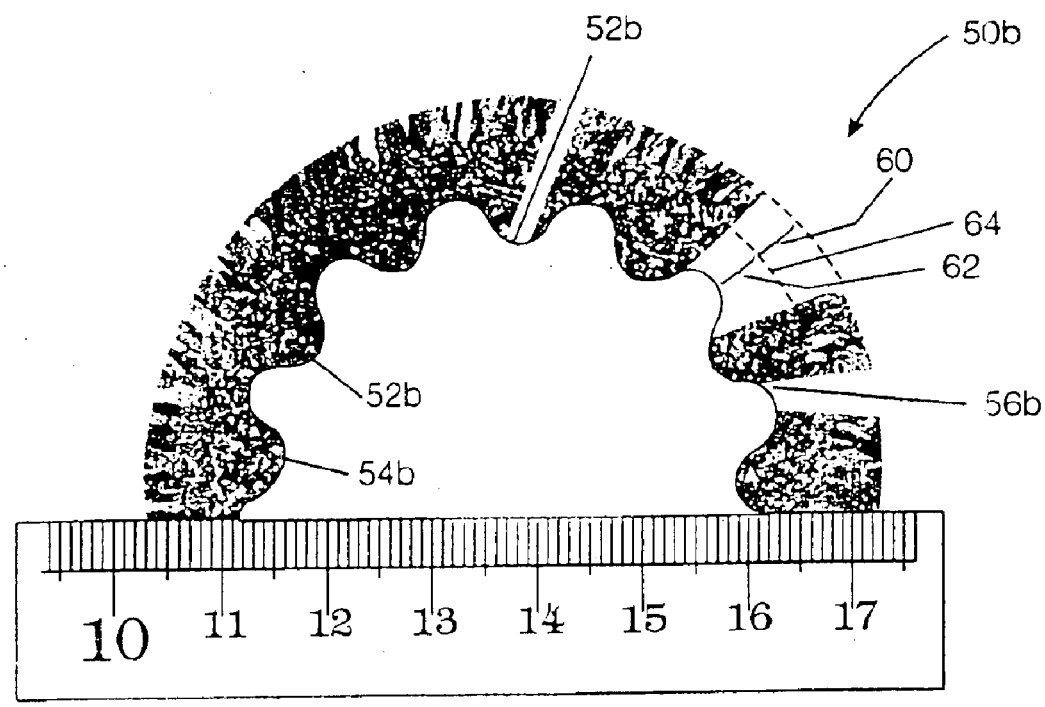
Figure 3B:
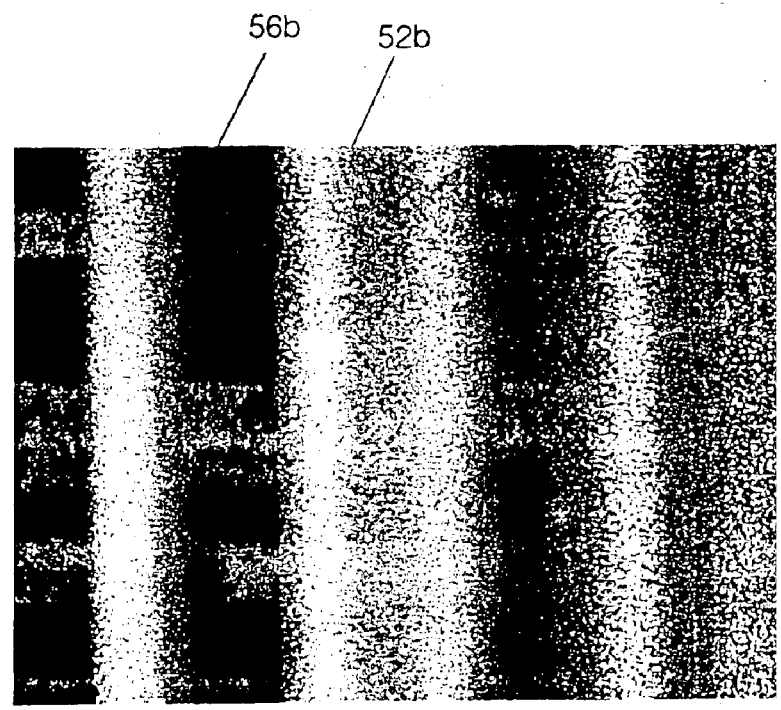

In FIG. 1 is shown a typical arrangement of pipes or tubes in a furnace box 10 having burners on its walls and/or floors. There are two series of inlets 12 and 14 in which feedstock and steam may be introduced at a temperature between about 350° C. and 800° C. The feedstock may be naphtha, liquid propane gas or ethane and in a first pass 16 the temperature of the reactants increases to between 800 and 950° C. In two middle passes 18, the temperature rises to between 850 and 1,050° C., before in a final pass 20 the temperature approaches 1,050–1,150° C. The product, ethylene, is ejected at outlet 22.

The gases are fed under a pressure of about 2–5 kgs per square centimeter. The tubes are arranged vertically with the inlet and exit tubes being supported on heels 24, 26, whereas intermediate passes are supported with hanging stirrups 28. Additionally, each tube is supported in the base of the furnace 10 on stilts 30.

The mass of the tubes, the temperatures at which they are operating, the pressures under which they are stressed and their life expectancy all conspire towards deformation of the tubes with the passage of time, leading to bowing of he tubes (bearing in mind their length of approximately 10 meters) and also possibly ballooning should any part of the tube come into contact with the walls of the furnace, or indeed with each other.

On top of deformation problems, there is also the problem of coking of the tubes, as well as carburisation of the tube material. Thermal cycling also increases stresses and accordingly a considerable volume of research has identified alloy compositions giving various preferred performances. Although the present invention is concerned primarily with creep strength, which prevents distortion of tubes over time at the elevated temperatures concerned, carburisation is also an issue addressed.

Table 1 below indicates the nominal compositions of a family of alloys marketed by the present applicants, each of which has particular known characteristics.

TABLE 1

| ALLOY | C | Cr | Ni | Nb | W | Others | Common Name |
|---|---|---|---|---|---|---|---|
| 1 | 0.4 | 25 | 20 | | | | H20/HK40 |
| 2 | 0.4 | 25 | 20 | | | Si | H21/HK40 |
| 3 | 0.3 | 24 | 24 | 1 | | | H24W/IN 519 |
| 4 | 0.4 | 25 | 35 | | 4 | | H34CT/HP W Mod |
| 5 | 0.4 | 25 | 35 | 1 | | | H39W/HP Nb Mod |
| 6 | 0.4 | 25 | 35 | 1 | | Additions | H39WM/HP Microalloy |
| 7 | 0.4 | 35 | 45 | 1 | | Additions | H46M/35/45 Microalloy |
| 8 | 0.1 | 20 | 32 | 1 | | | CR32W/800 H |
| 9 | 0.1 | 25 | 35 | 1 | | | CR39W/HP Mod Low C |

Each of the alloy compositions identified above is a "creep resistant alloy" as hereinbefore defined, although it is only those with the higher carbon and nickel contents, (Alloys 4 to 7 in Table 1, for example) which are markedly better, in terms of creep strength, than materials which can be wrought.

For example, Table 2 below compares four alloys from Table 1 with two prior art wrought materials (W1 and W2) in the standard "100,000 hour" creep rupture strength test, the values being, given in N mm$^{-2}$ (Mpa). (* indicates data not available).

TABLE 2

| Temperature ° C. | Alloy 4 | Alloy 5 | Alloy 6 | Alloy 7 | W1 | W2 |
|---|---|---|---|---|---|---|
| 900 | 22.4 | 24.3 | 29.7 | 26.3 | 11.4 | * |
| 950 | 14.7 | 15.9 | 20.1 | 13.6 | 7.5 | * |
| 1000 | 9.4 | 10.3 | 12.8 | 12.6 | 4.9 | 6.0 |
| 1050 | 5.8 | 6.5 | 7.8 | 8.1 | 3.2 | 3.6 |
| 1100 | 3.5 | 4.1 | 4.4 | 5.0 | 2.1 | 2.1 |

On the other hand, cast materials also have better carburisation resistance, notwithstanding their creep strength. In any event, none of the alloys in Table 1 can be rolled or extruded without destroying their superior as-cast properties, and consequently cannot be employed in the recently developed improved pyrolysis techniques requiring the use of tubes having an internally finned profile. The profile increases the surface area of the tubes which is in contact with the gases within the tubes, so that heat transfer rates can be increased. This is necessary because the new processes involve much faster passage of the gases through the tube coils and therefore a much shorter residence time within the furnace coils. Accordingly wrought alloy tubes have been employed, and FIGS. 2a to d and 4, as well as Table 2 above show some of the features of such a tube.

On the other hand, FIGS. 3a to d show the features of a corresponding tube constructed by centrifugal casting from creep resistant alloy, and the performance of the two tubes is compared hereinafter. In this example, each tube 50a, b has an outside diameter of about 70 mm, and each with 12 fins 52a, b on their internal surface. Each fin extends longitudinally along the tube and has a peak height of about 4.5 mm. The internal diameter of each tube, from valley to valley, is about 50 mm.

The composition by spectrographic analysis of each tube is shown in Table 3 below.

TABLE 3

| Element wt % | CAST H39W | WROUGHT tube |
|---|---|---|
| Carbon | 0.43 | 0.082 |
| Silicon | 1.3 | 0.66 |
| Manganese | 1.04 | 0.9 |
| Nickel | 33.9 | 36 |
| Chromium | 24.6 | 25.1 |
| Niobium | 1.01 | 0.074 |
| Titanium | 0.005 | 0.55 |
| Aluminium | 0.005 | 0.23 |
| Molybdenum | 0.05 | 0.26 |

There were no significant differences between the trace elements/contaminants of the two alloy compositions. The wrought finned tube of the prior art was basically still a "25/35-Cr/Ni" base, but with low carbon content and without niobium. Instead, titanium and aluminium have been added as strengtheners.

The outside surface finishes of the two samples are not especially significant and can be rendered the same by appropriate surface finishing. However, the internal bore surfaces 54a, b were different. Measurements of surface finish were carried out longitudinally along the bottom of valleys 56a, b between fins 52a, b and gave the following values:

Wrought finned tube: $R_A$:80 CLA micro-inches (0.00008 ins—2.0 μm)

Cast tube H39W: $R_A$:130 CLA micro-inches (0.00013 ins—3.3 μm)

Both these compare well with the normal "125CLA" finish for bored tubes. However, careful visual examination of the two different bore finishes revealed that the wrought finned tube samples showed prominent fine longitudinal surface cracks or scores 58 (see FIG. 2b) which are mainly along the tops of the fins, whereas the tube according to the present invention had a uniform finish or texture in all regions of the internal bore, i.e. both the valleys 56b and fins 52b. It is suspected that the roughness across the tops of the fins of the wrought tube are coarser than 130CLA micro-inches and possibly as much as 300CLA micro-inches. More significant is the fact that such fine surface scoring and damage could act as preferential sites for coke formation and carburisation in service.

Full transverse slices from each sample were micro-etched. The wrought finned tube showed uniform fine grain equiaxed structure across the wall, as is visible in FIG. 2a. However, the cast H39W sample showed a macro-structure of fine directional columnar grains radially arranged around an outside layer 60 of the tube 50b, and a small equiaxed layer from mid-wall 64 to the internal surface 54b.

While macro-structure tends to vary, particularly for small tubes with very fast solidification rates where columnar structure can predominate across the wall, one aspect of the present invention has the finning 52b, 56b constrained to the internal equiaxed layer 62. However, there is growing evidence that carburisation occurs more rapidly in fine equiaxed grains, rather than with coarser columnar grains, and that an equiaxed structure is not as strong as a columnar structure. Therefore a further preferred aspect of the present invention provides a tube which is columnar grained right across the wall thickness.

Longitudinal micro-sections were prepared of each sample to allow comparison, Figures c, and d showing sections near the wall surface and at the bore surface respectively of the wrought and cast tubes.

Figure 2A:
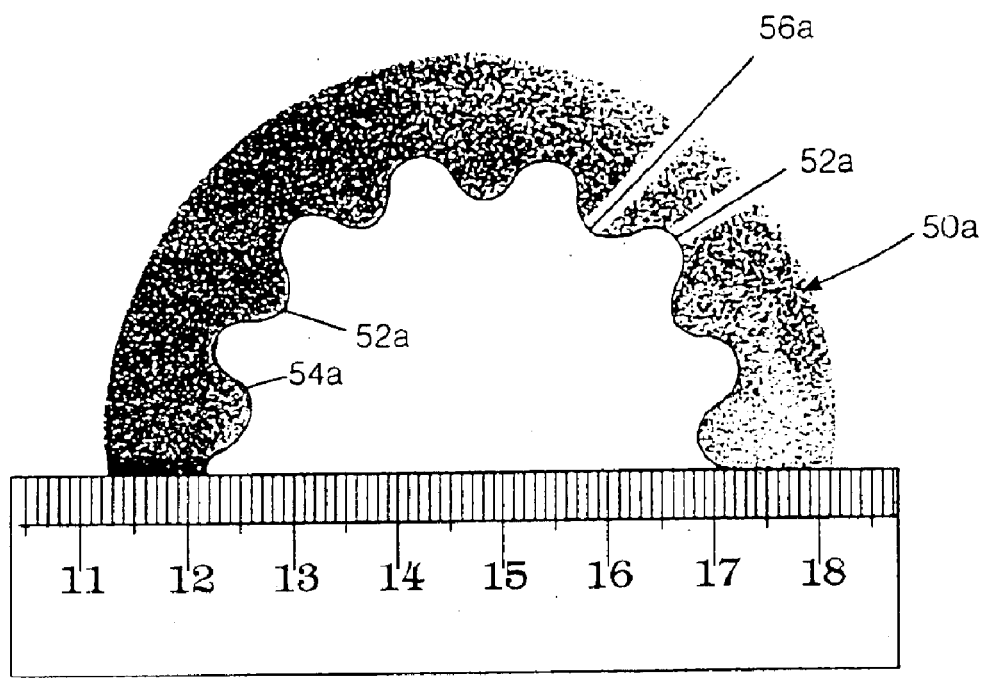
Figure 2B:
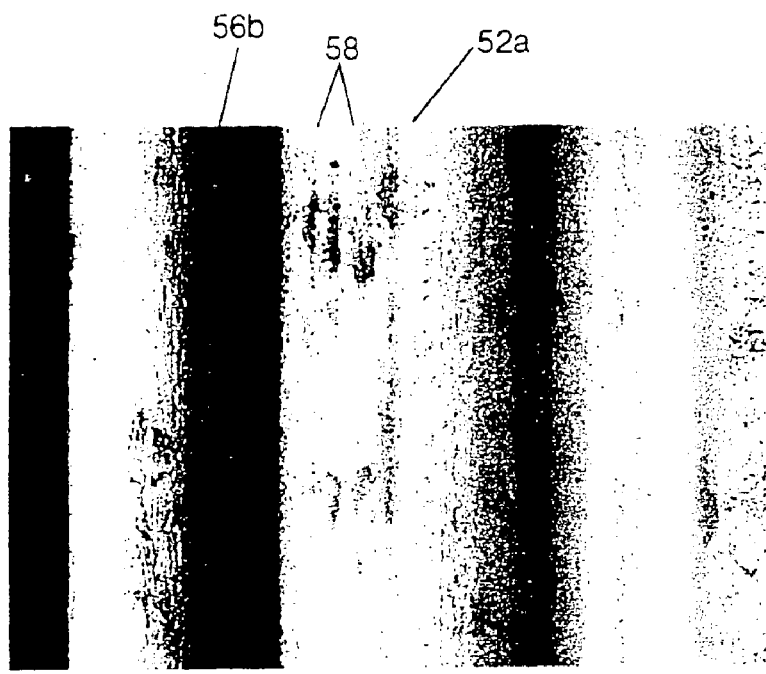
Figure 2C:
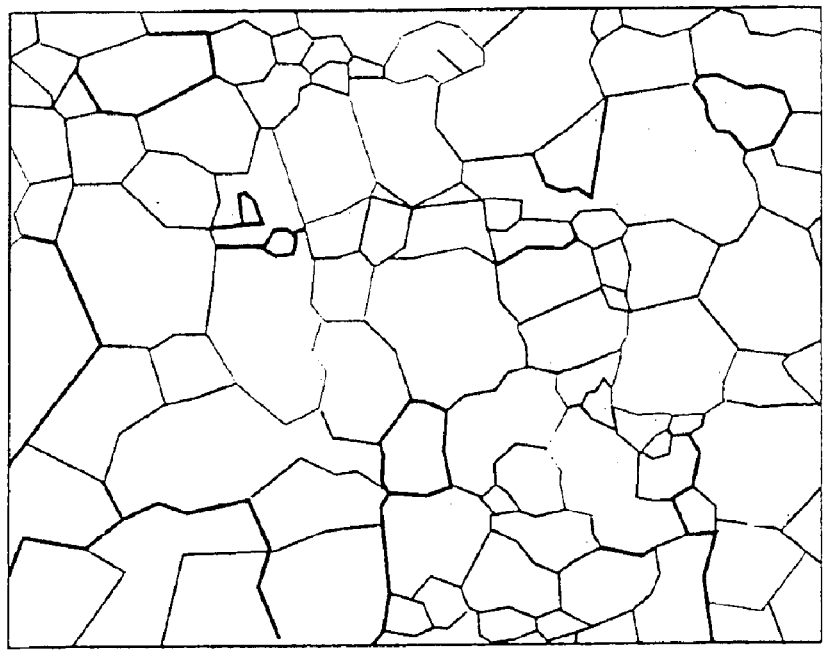
Figure 3C:
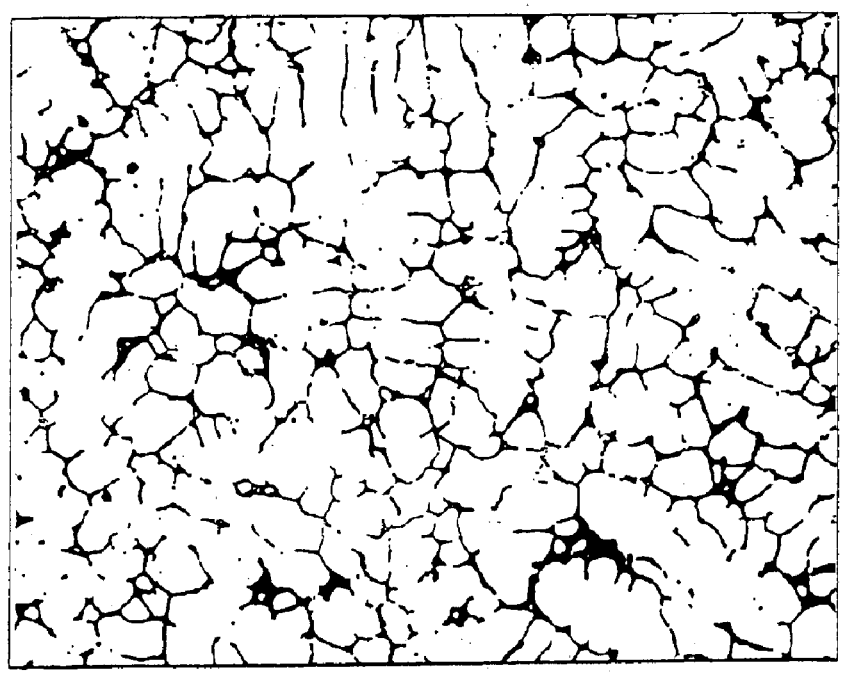

Thus in FIG. 2c, the wrought finned tube sample has polyhedral grains of average size G3, whereas in FIG. 3c, the H39W sample has a typical as-cast microstructure of primary inter-dendritic eutectic carbides and austenite dendrites with an average "sub-grain" size equivalent to G5.

Figure 2D:
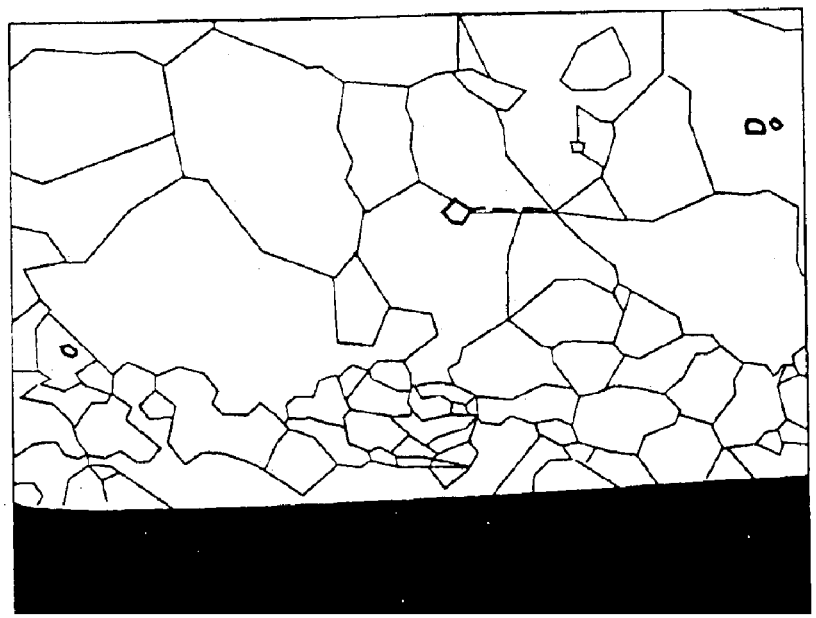
Figure 3D:
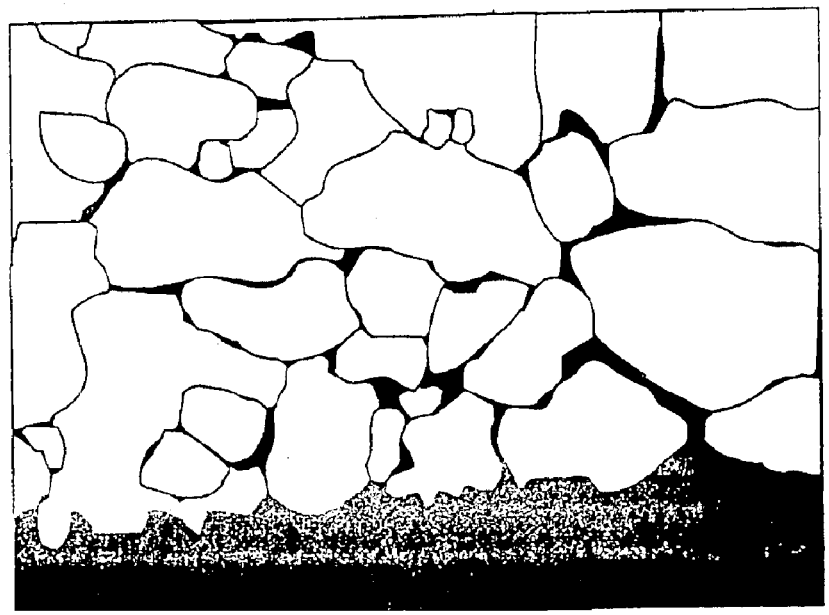

In FIG. 2d, the wrought tube has a layer of finer polyhedral grains to 90 μm depth, and some fine granular precipitation at the bore surface, (this layer may be due to contamination of the bore skin during the extrusion operation), whereas the H39W sample is as-cast.

Figure 4:
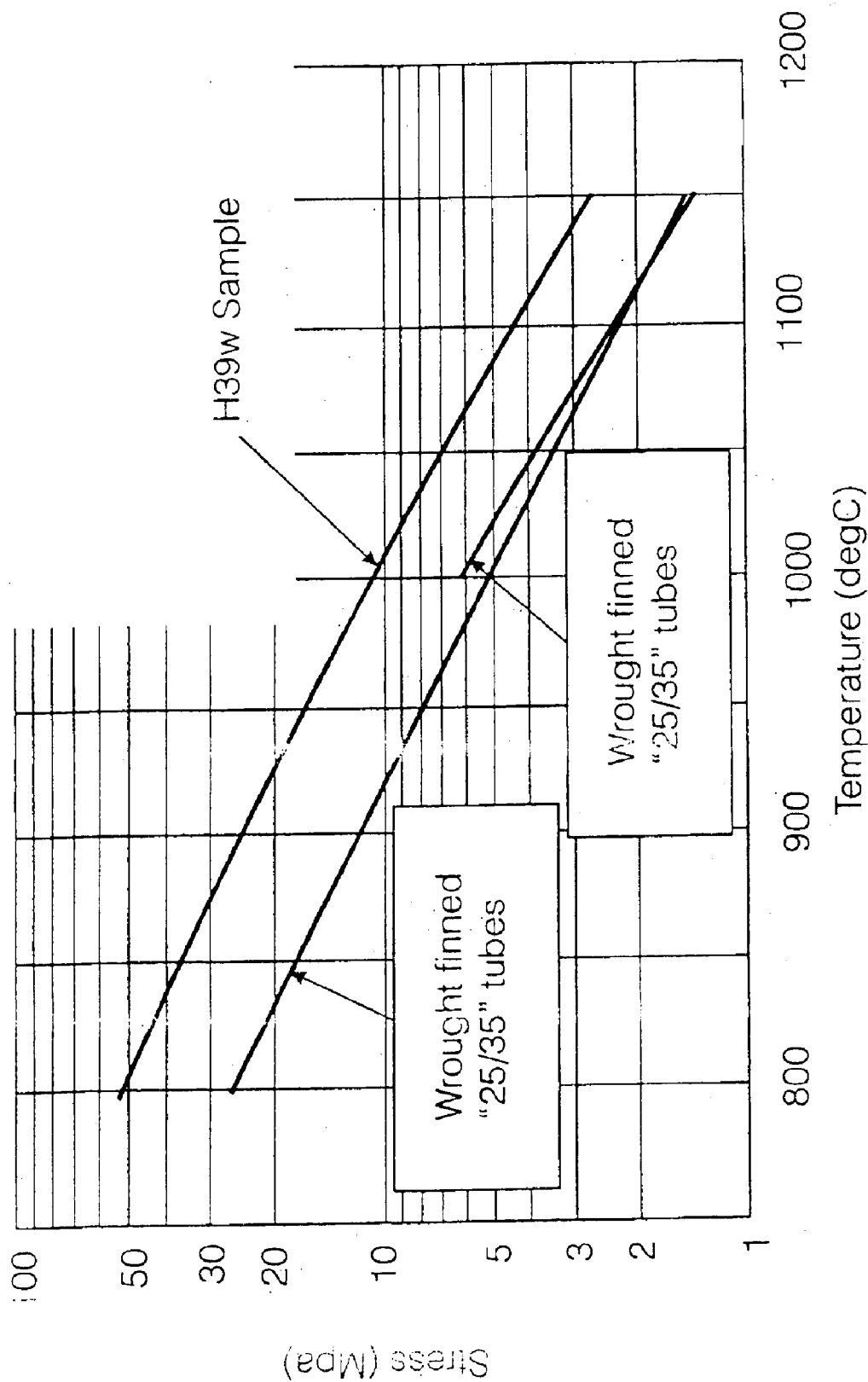
FIG. 4 is a graph comparing the 100,000*hour stress rupture values of wrought finned tubes and tubes made in accordance with the present invention.

However, the major advantage of the present invention tube over the wrought finned tube is illustrated in FIG. 4 which is a plot of some of the values given in Table 2 above. It can be seen from this plot and Table 2 that at least some tubes in accordance with the present invention have substantially superior creep rupture strength compared with the prior art. This enables pyrolysis operators, for example, to use thinner tubes while retaining lifetime performance, and thereby improving heat transfer rates. Alternatively, tubes according to the invention could operate at higher temperatures or for longer periods than the corresponding wrought material. Even creep resistant alloys which do not have much greater strength than conventional wrought steels (for example those having a 100,000 hour stress rupture value of only about 6 Mpa at 1000° C.) have other advantages in relation to carburisation resistance.

A tube in accordance with the present invention may be manufactured by a method according to the further aspects of the present invention.

For example, a molten alloy is first prepared having the requisite composition. The alloy is then poured into a rotating cylindrical mould so that the alloy is spun towards the outside of the mould. The speed of rotation is about 1,500 rpm and generates about 100 G on the bore of the solidifying tube. When the alloy has cooled sufficiently and solidified, the mould is stopped and the raw tube blank is rammed from the mould.

An inside layer of the blank is then (optionally) mechanically machined to produce a blank with a predetermined internal bore diameter.

Figure 5:
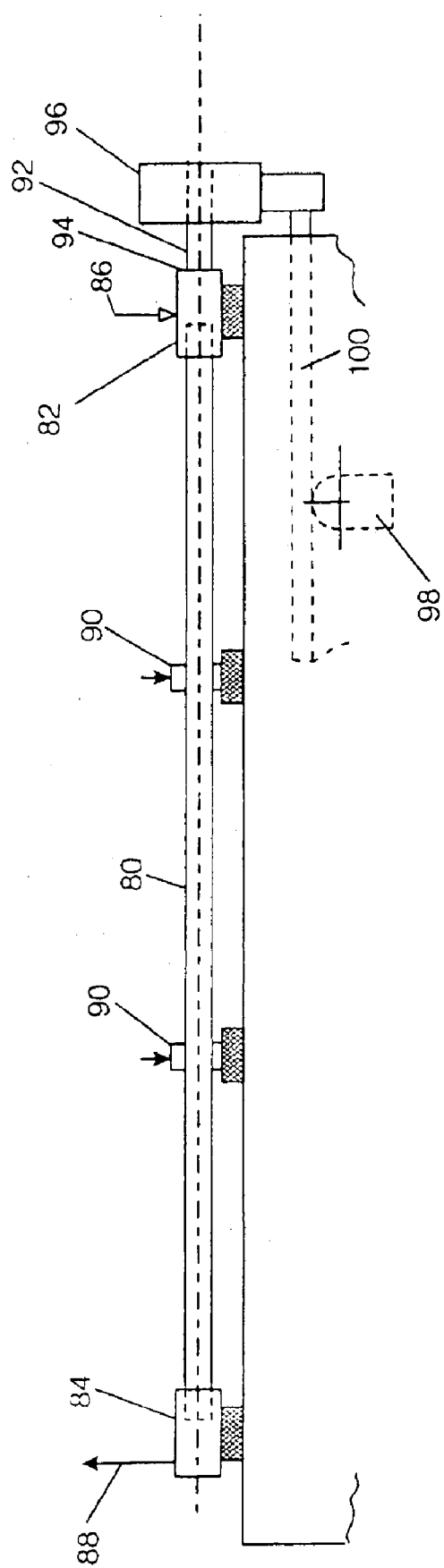
FIG. 5 is a schematic illustration of apparatus suitable for electrochemical machining of a tube in accordance with the present invention.

With reference to FIG. 5, the tube blank 80 is then mounted between starting 82 and ending 84 mounting means. The mounting means seal around the open ends of the tube blank 80 and allow ingress at 86 and egress at 88 of electrolyte pumped along the bore of the tube 80 by means not shown. Electrical clamps 90 spaced along the tube 80 provide electrical power to the tube 80. An electrode rod 92 extends through an aperture 94 of the starting mounting means 82. At one end of the rod 92 is an electrode (not shown in FIG. 5) while at its other end is a power connection block 96. Drive means 98 connected to a rack 100 draws the power connection block 96 from right to left in FIG. 5 and pushed the rod 92 with its electrode on its end into the bore of the tube 80. While the electrode is being driven into the bore of the tube 80, a substantial current is passed between the power connection block 96, electrode rod 92, the electrode, the tube 80, and the electrical clamps 90. Driving means for the current are not shown. At the same time, electrolyte is pumped past the electrode rod 92 and electrode through the bore of the tube 80. In the vicinity of the electrode, the bore of the tube is machined enabling the electrode to penetrate the bore of the tube 80.

Figure 6:
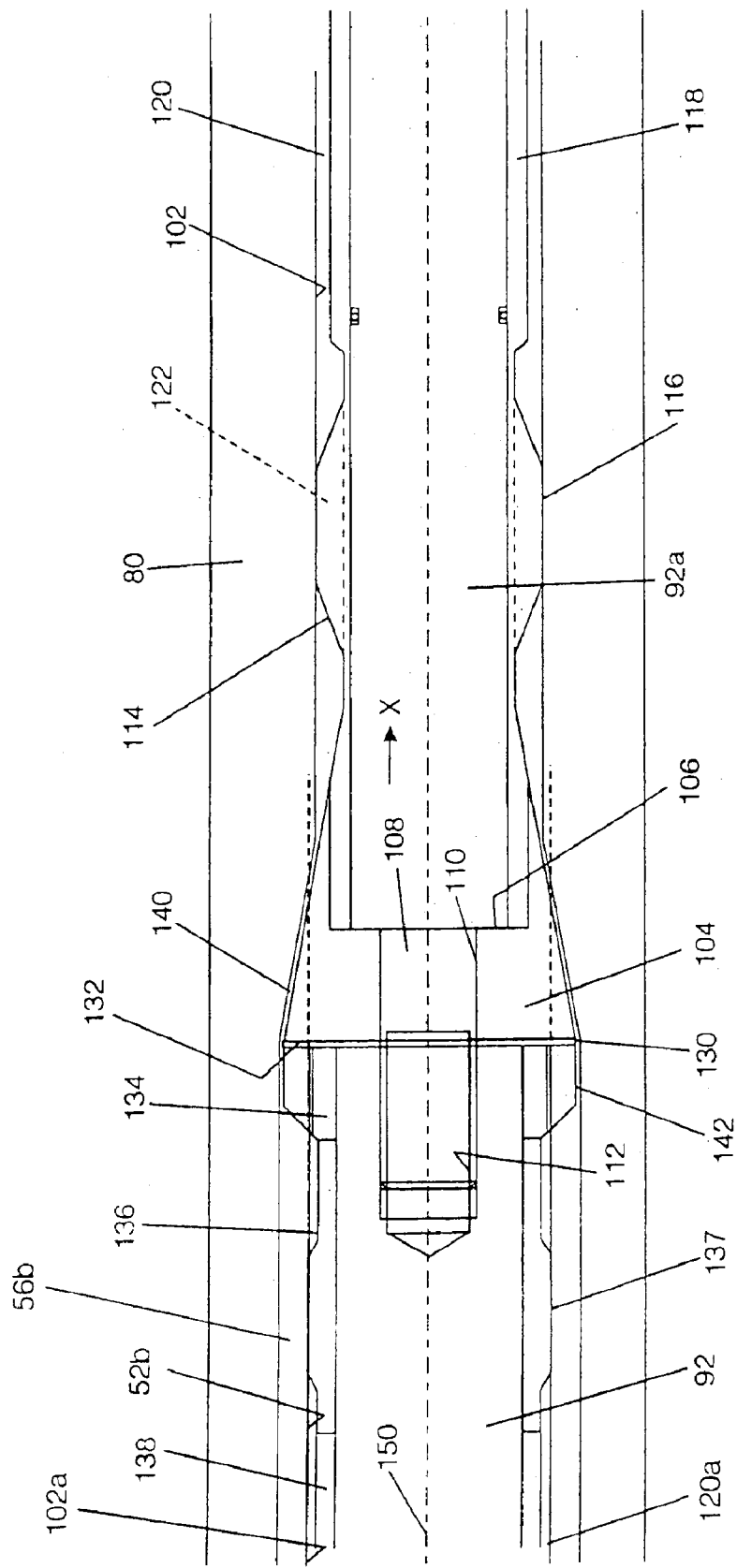
FIG. 6 is a section through an electrode within the confines of a tube in apparatus according to the present invention.

Turning to FIGS. 6–10, these illustrate features of a first embodiment of apparatus in accordance with the present invention. In FIG. 6, a tube 80 has a circular internal bore 102 through which an electrode 104 is being drawn. An electrode rod 92 abuts the rear end of the electrode 104 and supplies electrical power to it. In addition, an electrode rod extension 92a abuts a front face 106 of the electrode and has a threaded shaft 108 on its end which extends through a central bore 110 of the electrode. The shaft 108 is screwed into a correspondingly threaded bore 112 of the electrode rod 92. Thus the electrode 104 is clamped between the rods 92, 92a.

The electrode 104 has a front guide 114 which is a sleeve of insulating material about the rod extension 92a. The front guide 114 has spider fingers 116 which extend radially and which are a close sliding fit in the bore 102. In front of the sleeve 114, the rod 92a has an insulating cover 118 which is sufficiently thin to leave an annular gap 120 between the rod 92a and sleeve 118 and the internal bore 102 of the tube 80. Electrolyte flows in the annular gap 120 and past segmental spaces 122 between fingers 116.

Figure 8A:
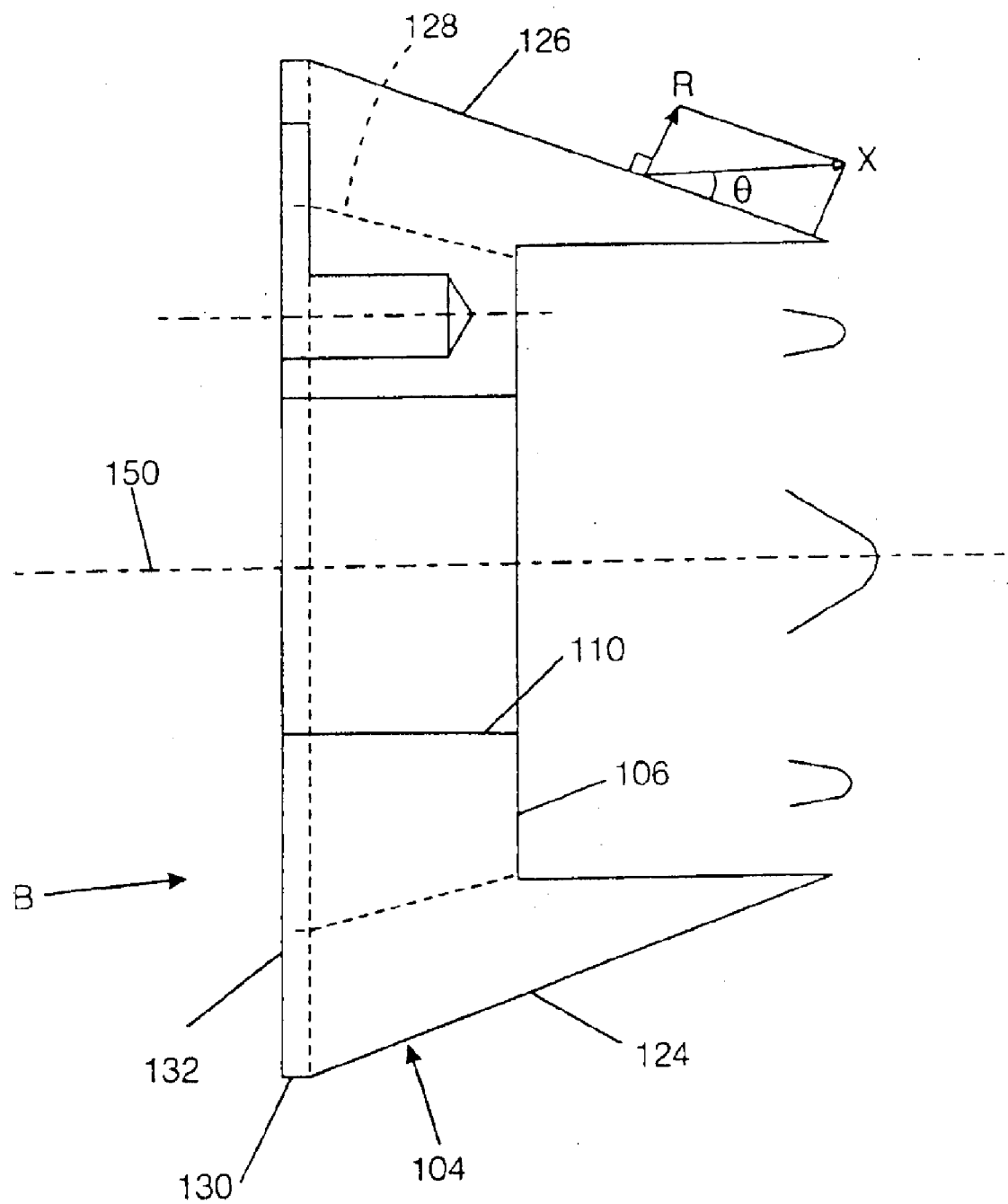
FIGS. 8a and 8b are a side section and view in the direction of arrow B in FIG. 8a, respectively, of the electrode in FIG. 6.
Figure 8B:
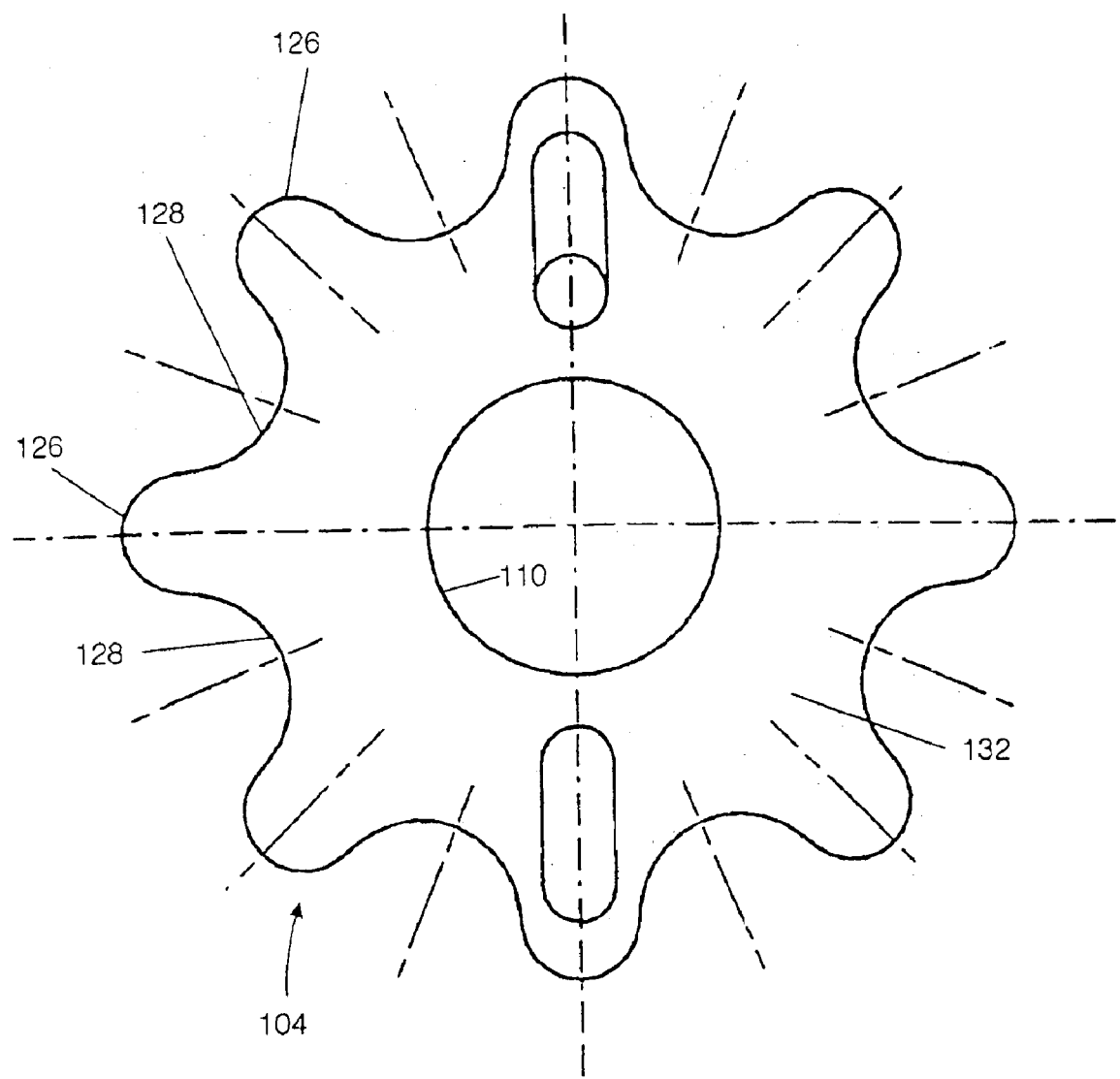
Figure 9:
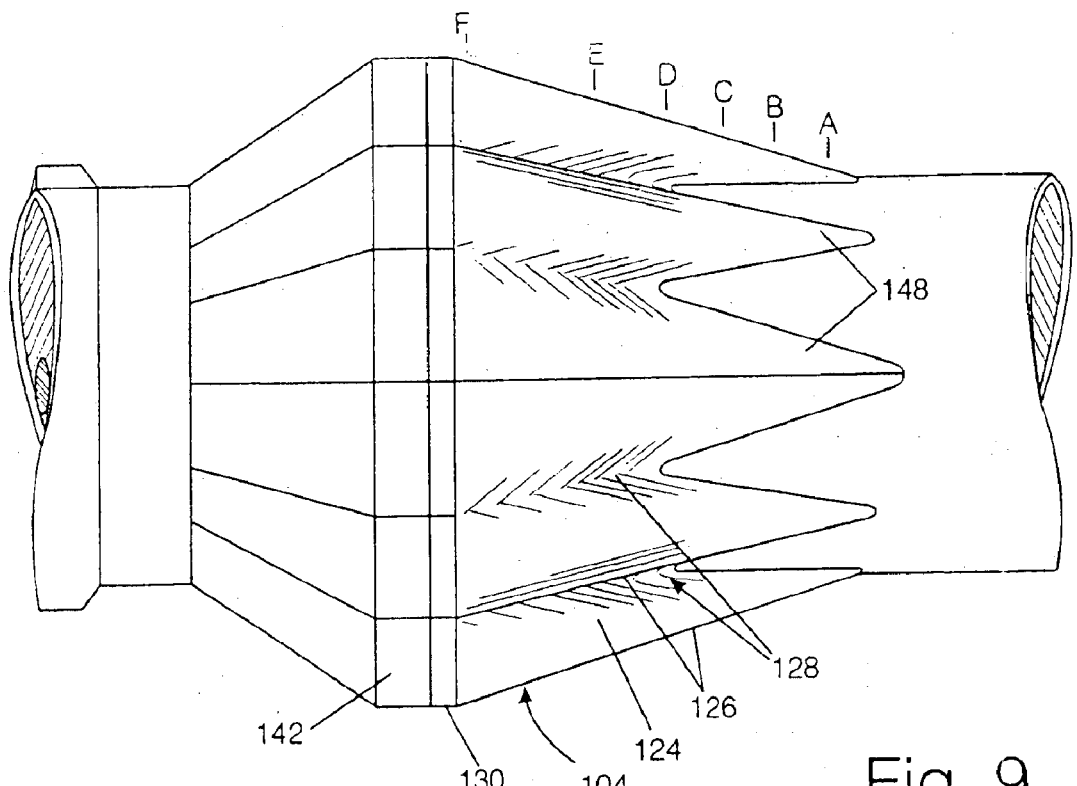
FIG. 9 is a side view of the electrode of FIGS. 6 to 8.

Turning to FIGS. 8 and 9, electrode 104 has a substantially frusto-conical external surface 124 in section (see FIG. 8a) but, as can be seen in FIGS. 8b and 9, the external surface of the electrode is, in fact, fluted having a series of ridges 126 separated by valleys 128. At the edge of a rear face 132 of the electrode 104, a short section 130 of the surface 124 of the electrode is parallel longitudinal axis 150 of the electrode and tube 80.

Turning back to FIG. 6, against rear face 132 is disposed a collar 134 of a rear guide 136. Rear guide 136 is also a sleeve disposed around electrode rod 92. Behind rear guide 136, the rod 92 has an insulated sleeve 138. As explained further below, as the electrode 104 is drawn through the tube 80, fins 52b and valleys 56b are formed in new bore 102a of the tube 80. Rear guide 136 therefore has a cylindrical section 137 which is a close sliding fit on the peaks 52b. A (finned) annular space 120a likewise surrounds the insulation 138 on the rod 92 permitting flow of electrolyte. However, at the cylindrical section 137 of the rear guide 136, flow only occurs in the valleys 56b.

For reasons explained further below, the direction of flow of electrolyte is also in the direction of the arrow X in FIG. 6, and, with a current flow between electrode 104 and tube 80, the material of the bore 102 of the tube 80 is machined and enters into solution so that a working face develops in the bore 102 over an area thereof which comes into close proximity with the electrode surface 124. Since the surface is machined before the electrode contacts the tube 80, a space 140 develops between the electrode and the bore whose profile corresponds substantially with the profile of the advancing face 124 of the electrode 104. Moreover, it is the space 140 which completes the fluid path for the electrolyte flow, commencing with the (finned) annular space 120a, the valleys 56b around the guide sleeve 137, space 140, segmental sections 122, and annular space 120.

It is to be noted that collar 134 has an external circumferential face 142 corresponding with the edge profile 130 of the rear face 132 of the electrode. Thus the space 140 extends rearwardly over the collar 134.

Referring to FIG. 8a, in moving in the direction of arrow X in FIG. 8a at a speed of X meters per second, face 124 (excluding edge portion 130) effectively advances in the direction of arrow R towards the face of the bore 102 being machined at a speed R equal to X sin θ, θ being the angle of inclination of the face 124. The electrode can only advance at this speed if the rate of machining of the face corresponds, and that depends, inter alia, on the current density over the entire area of the electrode. Since this area is much larger than the cross-sectional area of the electrode rod 92, it is the current carrying capacity of the rod 92 which limits the speed of progression of the electrode through the bore. It is for this reason that the rod extension 92a is provided which almost doubles the current carrying capacity of the current supply to the electrode 104 and therefore enables the electrode to be progressed much more quickly through the tube 80.

As mentioned above, the surface 130 of the electrode 104 does not progress towards the machined face of the bore 102, but should be regarded as the final sizing operation for the end-profile 102a of the tube 80.

Figure 10:
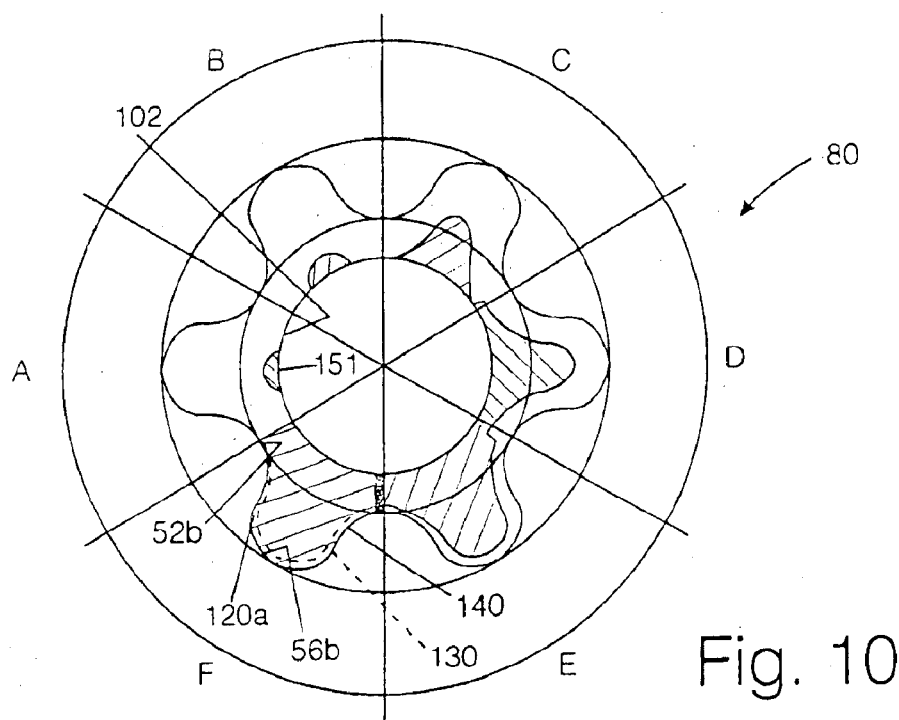
FIG. 10 is a schematic illustration showing the progression of machining of the bore of a tube as an electrode passes through it.

Also, it is to be noted that the entire circumference of the bore of the tube 80 is machined by the electrode 104 and FIG. 10 is a schematic illustration of the progression of the electrode through the tube 80. The shaded region in segment A represents the degree of machining of the bore 102 when the electrode 104 has progressed into the bore of the tube 80 up to point A in FIG. 9. Here only front fingers 148 of the electrode approach the internal surface 102 of the tube 80 and begin to machine groove 151. When the electrode reaches points B and C, groove 151 grows in size both in depth and in circumferential extent until point D is reached when the entire circumference of the bore 102 commences to be machined. Finally at F the full extent of the valleys 56b and peaks 52b are formed. It is to be noted that the electrode surface 130 is represented in sector F showing the space 140 between the electrode and the finally formed end-profile 120a.

Finally, referring to FIGS. 7a and 7b, tube 80 is shown mounted between starting 82 and ending 84 mounting means against which the ends of the tube 80 are sealed. Each mounting means 82,84 comprise an electrode housing 162, 172 respectively, the starting housing 162 being supplied with electrolyte tinder pressure through an inlet 164. Likewise ending housing 172 has an electrolyte outlet 174. Also, each housing has a stuffing box 166, 176 having central apertures 168, 178 respectively and through which the electrode rod 92 and rod extension 92a respectively pass. The apertures 168, 178 are a close sliding fit on the respective rod 92, 92a and seal against the rods to prevent leakage of electrolyte. Finally, at each end of the rods 92, 92a are power connection means 96, at least one of which provides a drive linkage for having the electrode 104 from the starting housing 162, through the tube 80 and into the ending housing 172.

The apparatus described with reference to FIGS. 6–9 is suitable for small bore pipe such as that described with reference to FIG. 3. However for larger diameter pipes, apparatus as illustrated in FIGS. 11–16 is preferred. Essentially this apparatus operates on the same principle and so only differences in construction will be discussed in detail. Like parts are given the same reference numeral as employed above, except, where there are differences, these are shown by the use of a prime, for example 104'.

In FIG. 11, a tube 80' is about to be machined by an electrode 104' which has a front guide 114' having splined guide surfaces 116'. The guide 114' is made from insulating material and is bolted to the electrode 104' by a bolt 117. Electrode 104' is itself bolted to intermediate block 105 which is bolted to the end of electrode rod 92'. Collar 134' is mounted behind trailing face 132' of the electrode 104' and subsequently mounts rear guide 136'. Insulation 138' is disposed around rod 92'. Because of the increased scale the difference in area of electrode working area to the cross-section of the rod 92', only a single electrode rod 92' is required. However, it would be feasible to further incline the working face 124' of the electrode 104 so that the working area is further increased, and in which event a singular electrode rod 92' may not be sufficient and an extension rod (not shown) as rod 92a in the FIG. 6 embodiment above might be required.

Figure 12A:
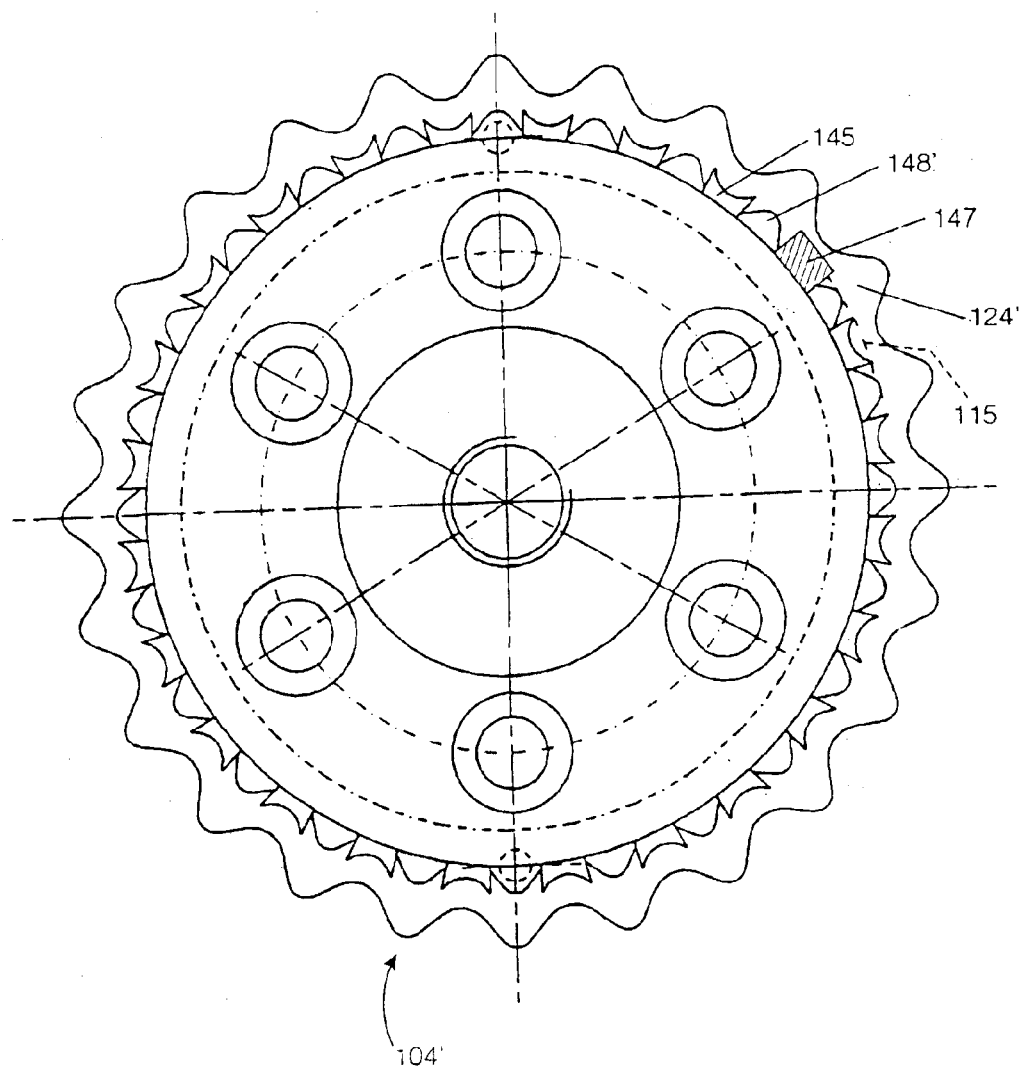
FIGS. 12a and 12b are an end view in the direction of arrow A in FIG. 12b, and a side section through the electrode in FIG. 11.
Figure 12B:
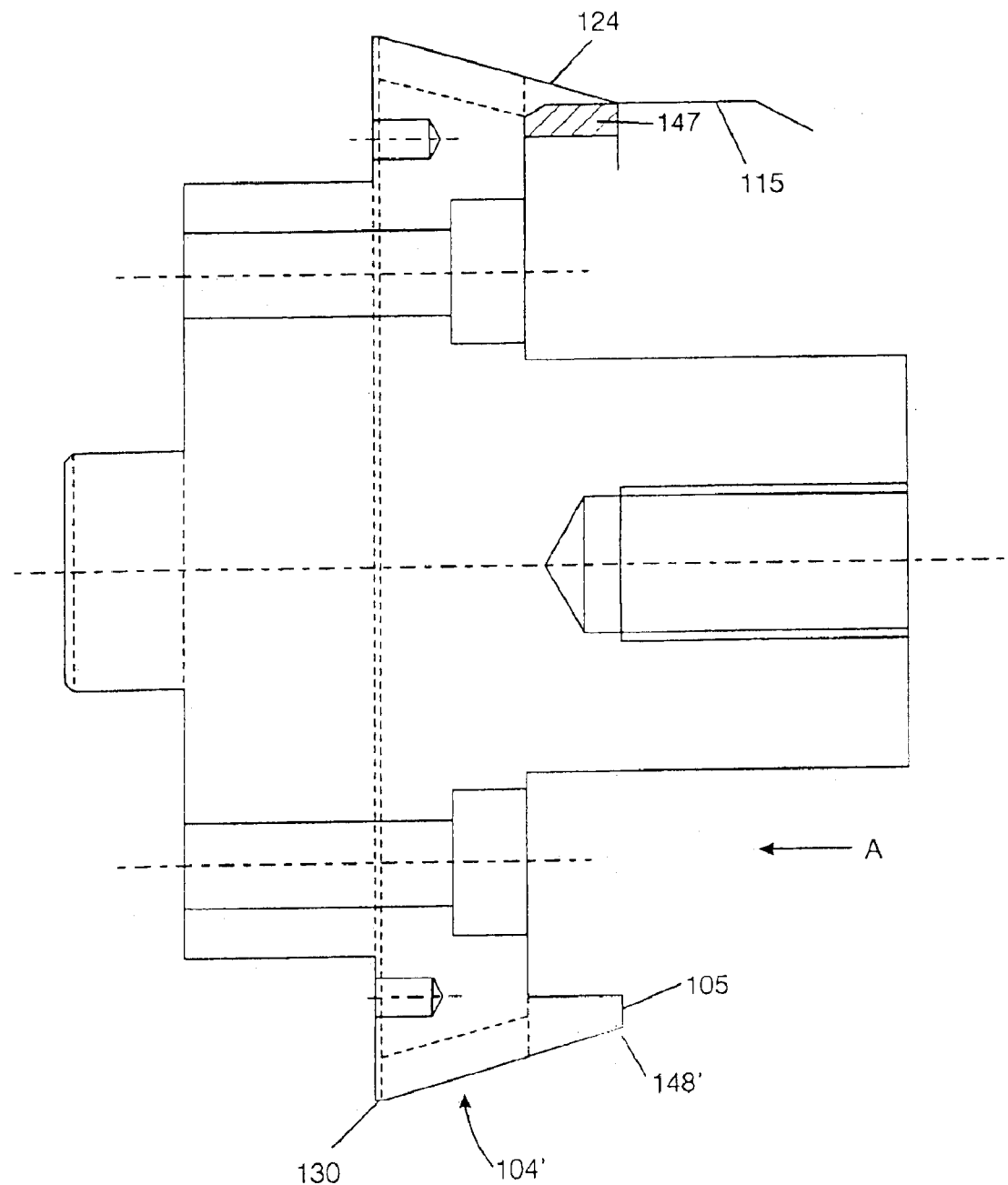

Turning to FIGS. 12a and 12b, electrode 104' is more robust than that described above in that fingers 148 in the FIGS. 6–9 embodiment are sharp and therefore exposed to mechanical damage, whereas fingers 148' in the present embodiment have radial depth to give them mechanical strength. However, this necessitates the use of a mask 149 (see FIG. 14a, 14b) having teeth 147 which extend radially outwardly and fill slots 145 between adjacent fingers 148'. A tooth 147 is shown in both FIGS. 12a and 12b. In FIG. 12b, a portion 115 of the front guide 114' is shown abutting front face 105 of the teeth 148'. Thus it is still only the inclined surface 124' of the electrode 104' which effects any surface machining. The electrode 104' likewise has a sizing region 130'.

Figure 15:
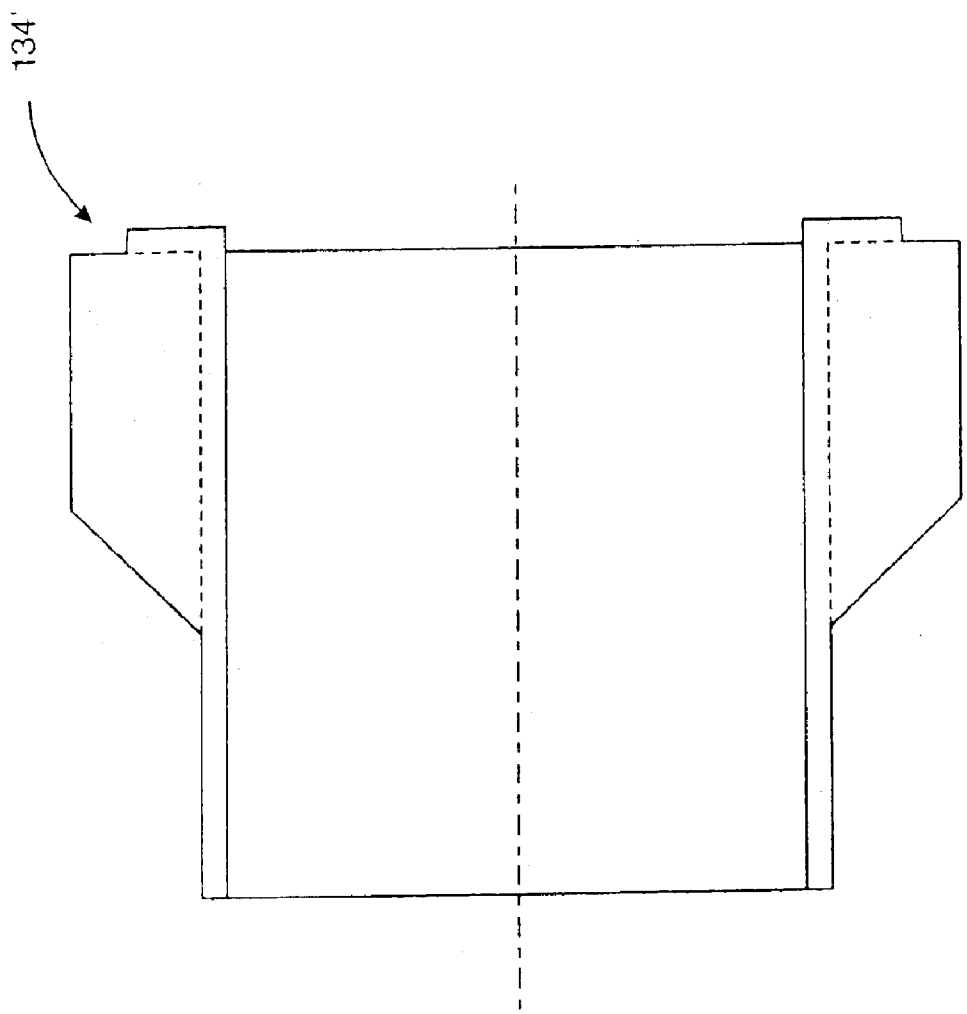
FIG. 15 is a side section through a part of the rear guide for the electrode of FIG. 12.

FIGS. 13a and 13b show the front guide having spider legs 116' and sectoral spaces 122' for the flow of electrolyte. FIG. 15 shows the collar 134'.

Figure 16A:
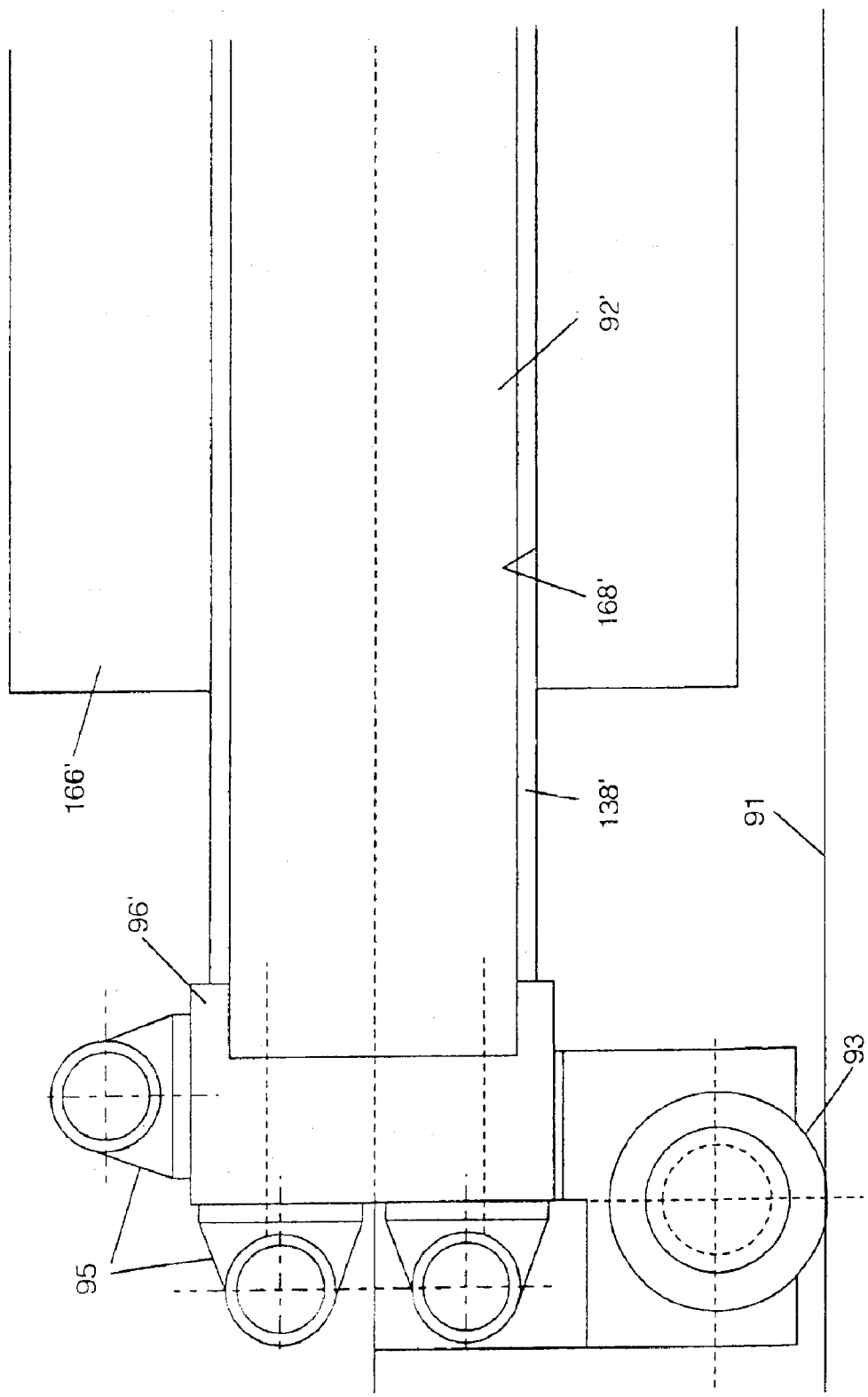
FIGS. 16a and 16b are a side section and end view respectively of the mounting arrangements for power connection means to an electrode rod in apparatus in accordance with the present invention.
Figure 16B:
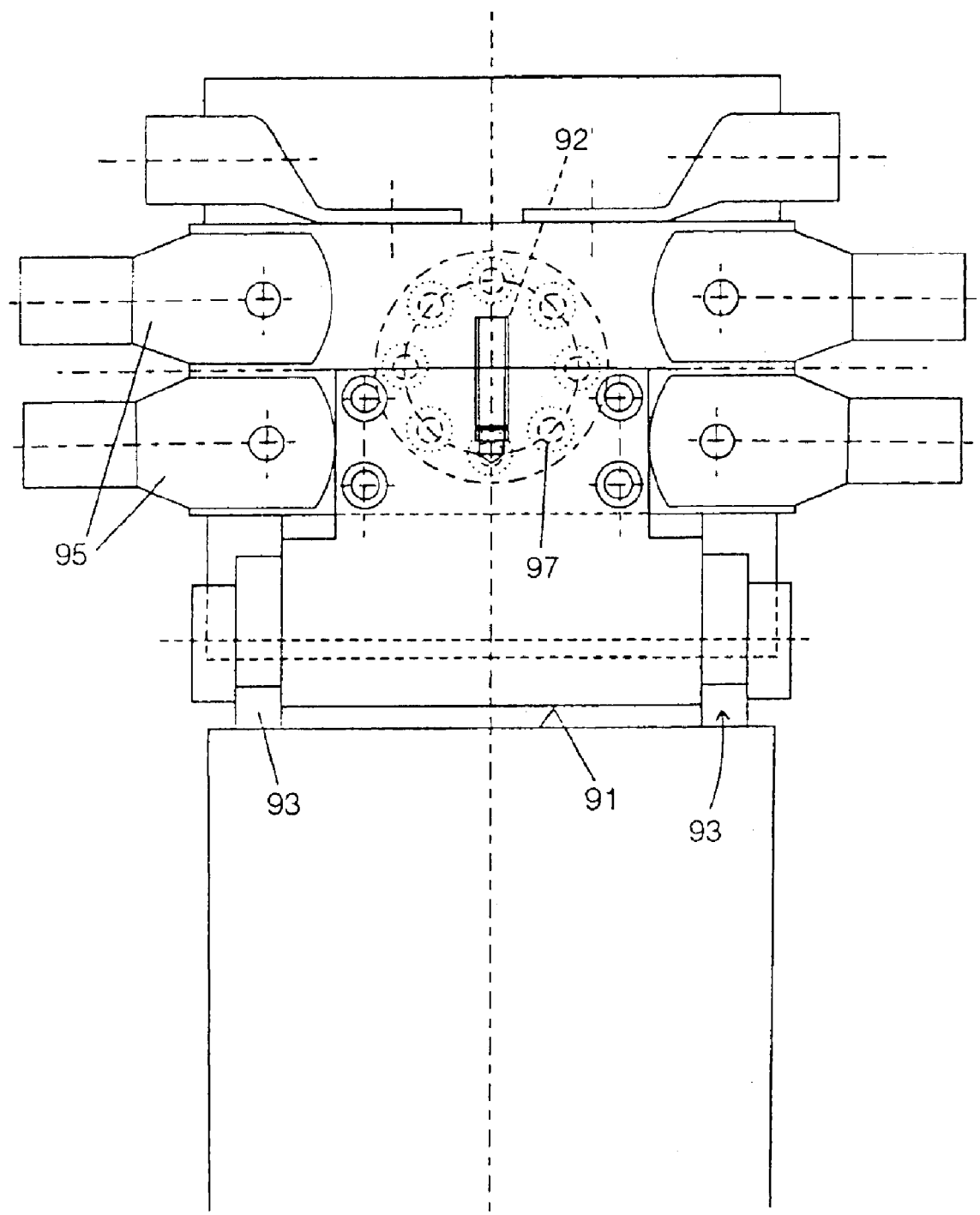

Because of the enlarged size of the electrode rod 92', the current capacity of the electrode if it has a diameter of 10–15 cm, is about 8,000 amps. Accordingly, a power connection block 96' (see FIGS. 16a and 16b) is bolted by a ring of bolts 97 to the electrode rod 92'. Six substantial electrical terminals 95 are shown bolted to the block 96' and through which electrical power is supplied to the electrode rod 92'. Also in FIG. 16a is shown the stuffing box 166' with its aperture 168' through which the rod extends. In view of the bulk of the arrangement, the connection block 96' is supported on a roller 93 supported on a support surface 91.

As with the previous embodiment, the direction of flow of electrolyte in the FIG. 11 embodiment is in the direction of the arrow X in FIG. 11. The reason for this direction of flow, both in this embodiment and the FIG. 6 embodiment is so that clean electrolyte fills the space 140 between the finishing ledge 130' and the final bore end-profile 102a of the tube 80. This ensures the most accurate surface finish and correspondence with the profile of the electrode.

As mentioned above, the current density is one of the determinants of the rate of draw of the electrode through the bore of the tube, and should therefore be as large as possible to increase the rate of draw as much as possible. A current density of between about 30 to 70 amps cm$^{-2}$ across the target area is presently feasible.

The electrolyte may be an aqueous solution of an inorganic salt, such as nitrate, chloride or bromide salts of sodium or potassium, and possibly mixtures thereof. One preferred electrolyte is sodium nitrate solution having a specific gravity of about 1.18 and a pH of between about 8.5 and 9.5. Such alkaline salt solutions have the advantage that metals precipitate out of solution as hydroxide salts almost immediately after being machined from the tube surface, so that the electrolyte is easily filtered and recycled after use.

The operating temperature of the electrolyte is preferably between about 38° C. and 42° C. This presupposes a heating means to warm the electrolyte during an initial period of operation; and a cooling means to cool the electrolyte as the machining progresses and heat is generated by the passing current. It also presupposes monitoring the temperature of the electrolyte to maintain it in this preferred range. None of such temperature regulating means is shown in the drawings.

An alternative electrolyte is a mineral acid such as sulphuric, nitric or hydrochloric acid. For example, nitric acid at a concentration of about 200 to 250 g/l at between 20 to 30° C. may be employed; or sulphuric acid at a concentration of about 180 to 240 g/l at a temperature of about 30 to 35° C. may be employed. Mineral acid electrolytes have the disadvantage that current reversal is periodically required to limit metal deposit on the electrode.

Other electrolytes are within the ambit of the present invention as the skilled person will understand.

What is claimed is:

1. A method of forming an end-profile in the bore of a tube of creep resistant alloy, the method comprising:

drawing, from a first end of the tube to a second end of the tube, an electrode having an external profile corresponding to a desired end-profile of the tube;

applying, across a space between a target area of the tube and the electrode, a potential difference for driving an electric current between the tube and the electrode;

passing an electrolyte along the tube to enable the electric current to flow and to cause metal from the surface of the target area of the tube to enter solution in the electrolyte;

maintaining the rate of draw of the electrode along the tube so that the space between the target area of the tube and the electrode remains substantially constant; and selecting the creep resistant alloy to include the following constituents in percent by weight as indicated: carbon, 0.1–0.5; chromium, 20–35; nickel, 20–45; niobium, 0–2; tungsten, 0–5; additions, 0–1; and the balance containing iron.

2. The method of claim 1, wherein applying a potential difference comprises selecting a potential difference such that, over the target area, the electric current has a current density between 20 and 80 amps cm-2.

3. The method of claim 1, wherein applying a potential difference comprises selecting a potential difference such that, over the target area, the electric current has a current density between 30 and 70 amps cm-2.

4. The method of claim 1, wherein maintaining the rate of draw comprises selecting a rate of draw between 2 and 20 millimeters per minute.

5. The method of claim 1, wherein maintaining the rate of draw comprises maintaining the rate of draw such that the space is between 0.2 and 0.7 millimeters.

6. The method of claim 1, wherein passing an electrolyte comprises selecting the electrolyte to be an aqueous solution of an inorganic salt.

7. The method of claim 6, further comprising selecting the salt from the group consisting of a nitrate, a chloride of sodium, a bromide of sodium, a chloride of potassium, a bromide of potassium.

8. The method of claim 7, further comprising maintaining the salt at a temperature of between 35 and 45 C, and/or at a specific gravity between 1.1 and 1.25, and/or at a pH of between 8 and 10.

9. The method of claim 8, further comprising maintaining the salt at a temperature of between 38 and 42 C, and/or at a specific gravity of about 1.18, and/or at a pH between 8.5 and 9.5.

10. The method of claim 8, wherein passing an electrolyte comprises selecting the electrolyte to include a mineral acid.

11. The method of claim 10, further comprising selecting the mineral acid from the group consisting of sulphuric, nitric and hydrochloric acids.

12. The method of claim 6, further comprising selecting the salt to be sodium nitrate.

13. The method of claim 1, further comprising providing a tube having a start-profile having a maximum diameter less than the diameter of a largest circle capable of fitting in the end-profile.

14. The method of claim 1, further comprising inclining the electrode with respect to the direction of draw, so that the target area of the tube is increased.

15. An electrochemical machining apparatus for machining an end-profile on the inside of a tube having a start-profile, the apparatus comprising:

a starting mount and an ending mount for mounting the tube, each being adapted to seal against one end of the tube and to supply one end of the tube with electrolyte;

an insulated conductive rod extending through an aperture in one of the starting and ending mounts;

an electrode having a profile corresponding to the end-profile and mounted on a first end of the insulated conductive rod;

a power source providing an electrical voltage between the tube and electrode;

a draw operatively connected to a second end of the rod to drive the electrode into the bore of the tube;

the rod being long enough that the electrode can be within the confines of either mount without the draw contacting the other of the mounts wherein the end-profile includes a plurality of peaks, a plurality of troughs adjacent to each of the peaks, and a plurality of undulating sections connecting each of the peaks with an adjacent trough; and the electrode further includes, at a front end thereof, a plurality of insulated sections, the insulated sections being disposed to suppress, during machining of the tube, removal of material from the peaks of the end profile.

16. The apparatus of claim 15, wherein the end-profile comprises a non-circular end profile having, in cross-section, a length that is at least 10% longer than the circumference of the smallest circle encompassing the entire end-profile.

17. The apparatus of claim 16, wherein the electrode comprises a front end and a rear end, the rear end having a final section of constant cross-section.

18. The apparatus of claim 17, wherein the final section comprises a section less than 2 millimeters in length.

19. The apparatus of claim 18, wherein the cross-section of the front end has an overall diameter less than or equal to a minimum diameter of the start-profile of the tube and the electrode tapers from the rear end to the front end.

20. The apparatus of claim 15, wherein the electrode further comprises, at a rear end thereof, an uninsulated section for removal of material from the complete circumference of the tube bore.

21. The apparatus of claim 15, wherein the electrode comprises:
 a front guide having a cross-section corresponding to the start-profile of the tube;
 a rear guide having a profile corresponding to the end-profile of the tube; and
 a passage for enabling flow of electrolyte along the tube past the electrode.

22. The apparatus of claim 21, wherein the end-profile includes peaks and troughs, and wherein the rear guide is shaped to provide a close sliding fit to the peaks of the end-profile and to form the passage between spaces bounded by troughs of the end-profile.

23. The apparatus of claim 21, wherein the front guide includes slots in its surface, the slots defining the passage.

24. The apparatus of claim 15, wherein the rod extends through the starting mount.

25. The apparatus of claim 24, further comprising an insulated rod extension connected to the power source and to the electrode and passing through an aperture in the end mount.

26. The apparatus of claim 15, wherein the tube comprises creep resistant alloy.

27. The apparatus of claim 26, wherein the creep resistant alloy comprises the following constituents in percent by weight as indicated: carbon, 0.1–0.5; chromium, 20–35; nickel, 20–45; niobium, 0–2; tungsten, 0–5; additions, 0–1; and the balance containing iron.

28. The apparatus of claim 26, wherein the creep resistant alloy has a mean 100,000 hour rupture value of more than 6 MPa at 1000 C.

29. A method of forming a furnace tube, the method comprising:
 providing a molten creep resistant alloy;
 casting the alloy in a rotating tubular mold to form a tubular blank having a central bore; and
 electrochemically machining a non-circular profile inside the bore.

30. The method of claim 29, wherein electrochemically machining comprises drawing a correspondingly shaped electrode along the tube while passing electrolyte along the tube.

31. The method of claim 29, further comprising boring the blank to form a circular bore of predetermined radius.

32. The method of claim 29, wherein electrochemically machining comprises:
 providing an electrode having an external profile corresponding to a desired end-profile of the tube;
 drawing the electrode from a first end of the tube to a second end of the tube;
 applying a potential difference across a space between the tube and the electrode;
 passing electrolyte between the tube and the electrode; and
 maintaining the rate of draw of the electrode so as to maintain an extent of the space.

33. The method of claim 29, wherein electrochemically machining is carried out on electrochemical machining apparatus comprising:
 a starting mount and an ending mount for mounting the tube, each being adapted to seal against one end of the tube and to supply one end of the tube with electrolyte;
 an insulated conductive rod extending through an aperture in one of the starting and ending mounts;
 an electrode having a profile corresponding to the end-profile and mounted on a first end of the insulated conductive rod;
 a power source providing an electrical voltage between the tube and electrode;
 a draw operatively connected to a second end of the rod to drive the electrode into the bore of the tube;
 the rod being long enough that the electrode can be within the confines of either mount without the draw contacting the other of the mounts.

34. The method of claim 29, wherein providing the molten creep resistant alloy comprises providing an allow having the following constituents in percent by weight as indicated: carbon, 0.1–0.5; chromium, 20–35; nickel, 20–45; niobium, 0–2; tungsten, 0–5; additions, 0–1; and the balance containing iron.

35. The method of claim 29, wherein providing a molten creep resistant alloy comprises providing an alloy that, when solidified, has a mean 100,000 hour rupture value of more than 6 MPa at 1000 C.

36. A method of forming an end-profile in the bore of a tube of creep resistant alloy, the method comprising:
 drawing, from a first end of the tube to a second end of the tube, an electrode having an external profile corresponding to a desired end-profile of the tube;
 applying, across a space between a target area of the tube and the electrode, a potential difference for driving an electric current between the tube and the electrode;
 passing an electrolyte along the tube to enable the electric current to flow and to cause metal from the surface of the target area of the tube to enter solution in the electrolyte;
 maintaining the rate of draw of the electrode along the tube so that the space between the target area of the tube and the electrode remains substantially constant; and
 selecting the creep resistant alloy to have a mean 100,000 hour rupture value of more than 6 MPa at 1000 C.

37. The method of claim 36, wherein applying a potential difference comprises selecting a potential difference such that, over the target area, the electric current has a current density between 20 and 80 amps cm-2.

38. The method of claim 36, wherein applying a potential difference comprises selecting a potential difference such that, over the target area, the electric current has a current density between 30 and 70 amps cm-2.

39. The method of claim 36, wherein maintaining the rate of draw comprises selecting a rate of draw between 2 and 20 millimeters per minute.

40. The method of claim 36, wherein maintaining the rate of draw comprises maintaining the rate of draw such that the space is between 0.2 and 0.7 millimeters.

41. The method of claim 36, wherein passing an electrolyte comprises selecting the electrolyte to be an aqueous solution of an inorganic salt.

42. The method of claim 41, further comprising selecting the salt from the group consisting of a nitrate, a chloride of sodium, a bromide of sodium, a chloride of potassium, a bromide of potassium.

43. The method of claim 42, further comprising maintaining the salt at a temperature of between 35 and 45 C, and/or at a specific gravity between 1.1 and 1.25, and/or at a pH of between 8 and 10.

44. The method of claim 43, further comprising maintaining the salt at a temperature of between 38 and 42 C, and/or at a specific gravity of about 1.18, and/or at a pH between 8.5 and 9.5.

45. The method of claim 43, wherein passing an electrolyte comprises selecting the electrolyte to include a mineral acid.

46. The method of claim 45, further comprising selecting the mineral acid from the group consisting of sulphuric, nitric and hydrochloric acids.

47. The method of claim 41, further comprising selecting the salt to be sodium nitrate.

48. The method of claim 36, further comprising providing a tube having a start-profile having a maximum diameter less than the diameter of a largest circle capable of fitting in the end-profile.

49. The method of claim 36, further comprising including the electrode with respect to the direction of draw, so that the target area of the tube is increased.

* * * * *